United States Patent [19]

Lopresti

[11] Patent Number: 5,757,959

[45] Date of Patent: May 26, 1998

[54] SYSTEM AND METHOD FOR HANDWRITING MATCHING USING EDIT DISTANCE COMPUTATION IN A SYSTOLIC ARRAY PROCESSOR

[75] Inventor: Daniel P. Lopresti, Hopewell, N.J.

[73] Assignee: Panasonic Technologies, Inc., Princeton, N.J.

[21] Appl. No.: 417,100

[22] Filed: Apr. 5, 1995

[51] Int. Cl.⁶ ................................................. G06K 9/00
[52] U.S. Cl. ........................ 382/186; 382/189; 395/800
[58] Field of Search ................................. 382/186, 187, 382/189, 315; 395/800

[56] References Cited

U.S. PATENT DOCUMENTS

| | | | |
|---|---|---|---|
| 4,495,644 | 1/1985 | Parks et al. | 382/3 |
| 4,607,386 | 8/1986 | Morita et al. | 382/13 |
| 4,685,142 | 8/1987 | Ooi et al. | 382/13 |
| 4,731,857 | 3/1988 | Tappert | 382/9 |
| 4,958,348 | 9/1990 | Berlekamp et al. | 371/37.1 |
| 5,040,222 | 8/1991 | Muroya | 382/3 |
| 5,051,947 | 9/1991 | Messenger et al. | 364/900 |
| 5,113,452 | 5/1992 | Chatani et al. | 382/13 |
| 5,151,950 | 9/1992 | Hullender | 382/13 |
| 5,177,793 | 1/1993 | Murai et al. | 382/30 |
| 5,179,378 | 1/1993 | Ranganathan et al. | 341/51 |
| 5,214,717 | 5/1993 | Kimura et al. | 382/21 |
| 5,222,155 | 6/1993 | Delanoy et al. | 382/30 |
| 5,276,471 | 1/1994 | Aragon | 382/40 |
| 5,285,505 | 2/1994 | Kim et al. | 382/13 |
| 5,303,312 | 4/1994 | Comerford et al. | 382/13 |
| 5,313,527 | 5/1994 | Guberman et al. | 382/13 |
| 5,313,528 | 5/1994 | Nishida | 382/23 |
| 5,553,272 | 9/1996 | Ranganathan et al. | 395/500 |

OTHER PUBLICATIONS

D. Lopresti, "P–NAC: A Systolic Array for Comparing Nucleic and Acid Sequences", *Computer*, pp. 98–99 (Jul. 1987).

D. Lopresti, Dissertation—"Discounts for Dynamic Programming with Applications in VLSI Processor Arrays", Princeton University, Computer Science Dept. (1986).

R. Lipton, et al., "Comparing Long Strings on a Short Systolic Array", *Systolic Arrays*, pp. 181–190 (1987).

R. Lipton, et al., "A Systolic Array for Rapid String Comparison", *1985 Chapel Hill Conference on Very Large Scale Integration*, pp. 363–376(1985).

J. Esakov, et al. "Classification and Distribution of Optical Character Recognition Errors", *Proceedings SPIE—Document Recognition*, vol. 2181, pp. 204–216 (Feb. 1994).

(List continued on next page.)

*Primary Examiner*—Leo Boudreau
*Assistant Examiner*—Brian P. Werner
*Attorney, Agent, or Firm*—Ratner & Prestia

[57] ABSTRACT

Apparatus and a method for comparing an electronic handwritten pattern to a stored string are provided. The string includes a group of portions, each having at least one stroke. Movement of a stylus forms the pattern, and a sequence of strokes is generated. Each stroke represents a stylus movement within a predetermined alphabet. The sequence of strokes has a plurality of portions. A linear systolic array processor determines an edit distance between the string and the pattern. The processor compares a first portion of the string to a first portion of the pattern. A plurality of edit distance components are generated based on the comparison. Each component corresponds to a different set of operations that transforms the first portion of the stored string into the first portion of the pattern. The components are calculated based on a further comparison between additional portions of the stored string and the pattern. The component which has a minimum value is selected. The comparison is performed between each respective portion of the pattern and the corresponding portion of the stored string. The total edit distance is based on the component selected during a last comparison between a last portion of the stored string and a last portion of the pattern.

25 Claims, 16 Drawing Sheets

OTHER PUBLICATIONS

D. Hoang, "FPGA Implementation of Systolic Sequence Alignment", *Field–Programmable Logic & Applications*, pp. 1–4 (1992).

M. Gokhale, et al. "Building and Using a Highly Parallel Programmable Logic Array", *Computer*, pp. 81–89 (Jan. 1991).

R. Hughey, et al. "Architecture of a Programmable Systolic Array", *Proceedings—International Conference on Systolic Arrays*, pp. 41–49 (May 1988).

SYSTEM AND METHOD FOR HANDWRITING MATCHING USING EDIT DISTANCE COMPUTATION IN A SYSTOLIC ARRAY PROCESSOR

FIELD OF THE INVENTION

The present invention is related to the field of matching of electronic handwritten patterns.

BACKGROUND OF THE INVENTION

Pen-based computers and personal digital assistants (PDA's) are products that are now gaining increasing consumer acceptance. One of the more important functions in a PDA's is the ability to match an input pattern of "electronic ink" to a database of previously written and stored ink. Electronic ink is a pattern formed by movement of a stylus across a digitizing pad. Formally, electronic ink is defined to be a set of x, y coordinates sampled over time with sampling time instants $t_1$ through $t_k$ (k an interger):

$$\text{electronic ink} = \{(x_1, y_1, t_1), (x_2, y_2, t_2), \ldots, (x_k, y_k, t_k)\} \quad (1)$$

The "ink" in a given passage does not appear in a random fashion; it is created by the inherently sequential process of writing with a pen. This adds a significant amount of structure to the problem. A pen-stroke is a segment of ink delimited by events from a predetermined class (e.g., pen-up's and pen-down's, p-minima and p-maxima), with all the points between two such events assigned to the same stroke. Assuming uniform sampling, as is often the case, and $t_i < t_j$ for $i < j$ i,j integers less than k, then the temporal component may be omitted, and a single pen-stroke may be represented as in equation (2):

$$\text{pen-stroke} = <\text{start}>(x_1, y_1)(x_2, y_2) \ldots (x_n, y_n)<\text{end}> \quad (2)$$

That is, a pen-stroke is a string over the alphabet consisting of the points on a page.

It is usually desirable to normalize the pen-stroke data to eliminate its explicit spatial dependence. A common technique classifies each stroke as one of a small number of possible stroke types (symbols). For example, there may be 64 different strokes, each represented by a canonical vector of features extracted from the point data (e.g., overall orientation of the stroke, velocity and acceleration of the pen tip). An incoming stroke is classified by finding the canonical vector to which it is most similar. This general procedure is known as vector quantization. Vector quantization is performed to yield strings, each string comprising combinations of the alphabet of symbols.

Let $\Sigma$ be the alphabet of possible stroke types. The handwriting matching problem may be expressed as follows: Given a sequence of m pen-strokes $P = p_1, p_2, \ldots p_m$, where $p_i \in \Sigma$ (the pattern), and a sequence of n pen-stoke $T = t_1, t_2 \ldots t_n$, where $tj \in \Sigma$ (the text), determine all locations in T where P appears.

This problem differs significantly from the exact string matching problem, in that perfect matches between the symbols of P and T do not occur. The natural variation in human writing leads to ambiguity in stroke segmentation and classification. There is always the very real possibility that an occasional stroke is deleted, added, or split in two, or that two adjacent strokes are merged into one. Such "errors" are unavoidable.

One of the most important issues involving electronic ink matching concerns the searching of large quantities of previously stored pen-stroke data. Efficient, well-known techniques exist for matching simple text strings. These include exact methods (e.g., Knuth-Morris-Pratt, Boyer-Moore), methods employing wild-cards (e.g., UNIX grep), and approximate methods (e.g., Levenshtein or edit distance).

However, there is no rapid method to address the problem of matching electronic ink strings. In a PDA, for example, it may take several minutes to scroll manually through a large notepad to locate an item of interest. A rapid system and method for electronic ink matching is desired. In particular, a system and method that may be adapted for use in a PDA is desired.

SUMMARY OF THE INVENTION

The present invention is embodied in apparatus and a method for comparing an electronic handwritten pattern to a stored string. The stored string includes a group of portions. Each portion has at least one stroke.

The apparatus comprises a mechanism for monitoring movement of a stylus that forms the electronic handwritten pattern, and for generating a sequence of strokes. Each stroke represents one of a plurality of predetermined stylus movements within a predetermined alphabet. The sequence of strokes has a plurality of portions.

A linear systolic array processor determines an edit distance between the stored string and the sequence of strokes.

The systolic array processor includes a mechanism for comparing a first one of the group of portions of the stored string to a first one of the plurality of portions of the sequence of strokes to form a comparison. The comparing mechanism generates a plurality of edit distance components based on the comparison. Each edit distance component corresponds to a respectively different set of operations that transforms the first portion of the stored string into the first portion of the pattern. At least one of the plurality of edit distance components is calculated based on a further comparison between a second portion of the stored string and a second portion of the sequence of strokes.

A further mechanism selects the edit distance component which has a minimum value from among the plurality of edit distance components.

Another mechanism determines the edit distance based on the edit distance component selected by the selecting means based on a plurality of comparisons, wherein the plurality of comparisons includes the comparison and the further comparison.

3

Figure 6:
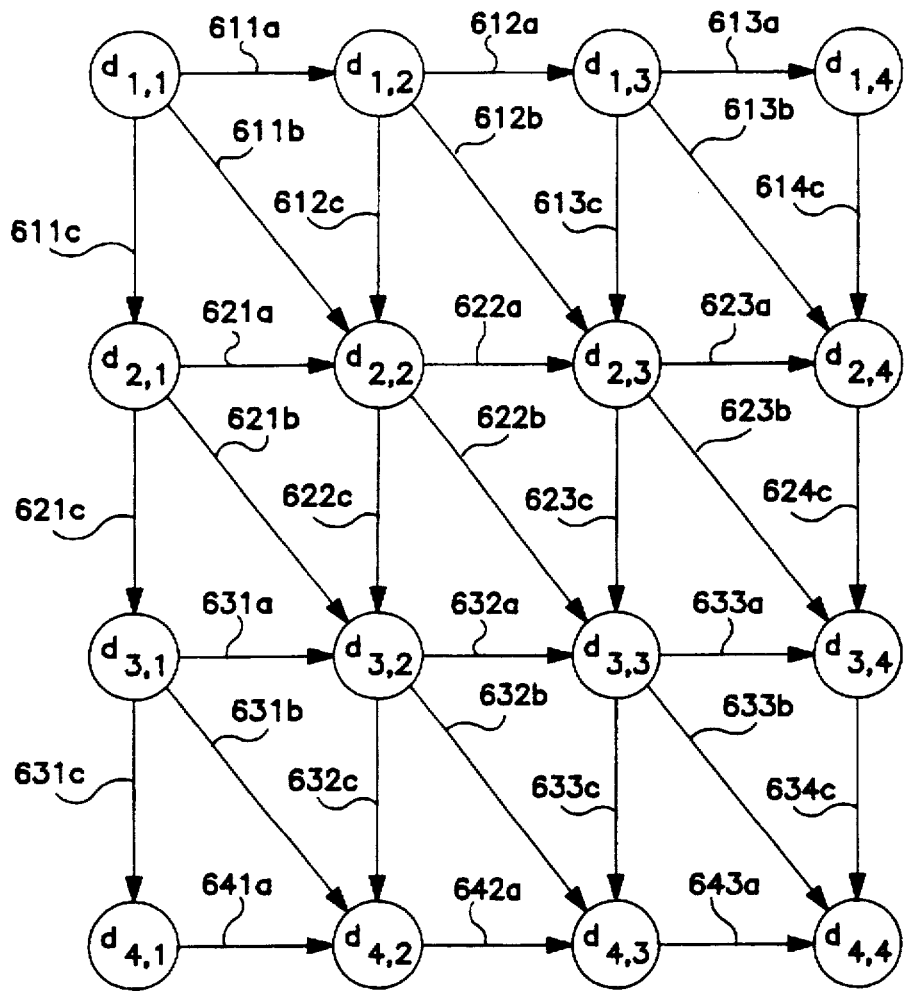
FIG. 6 is a data flow diagram showing how the edit distance components computed in FIG. 2 are related to one another.
Figure 7A:
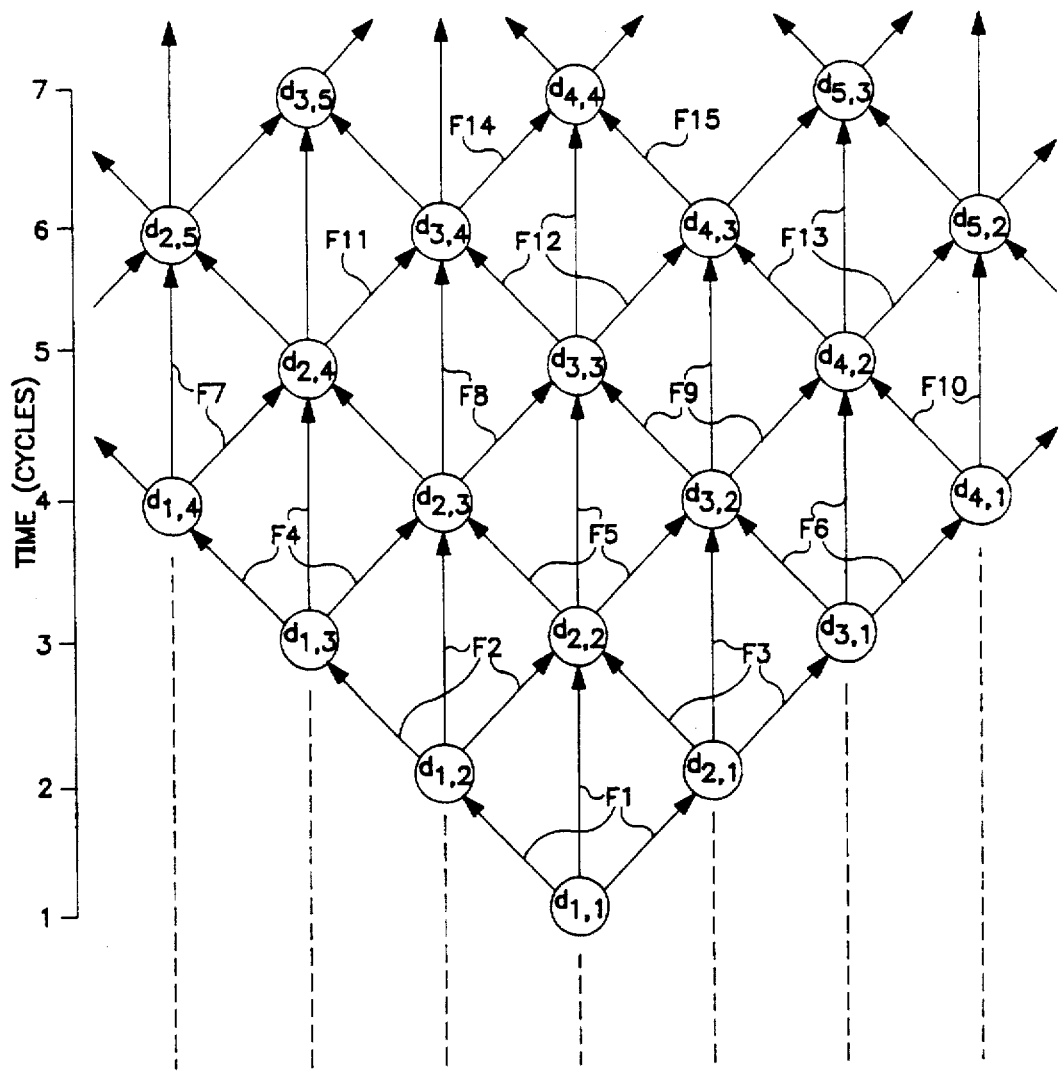
Figure 7B:
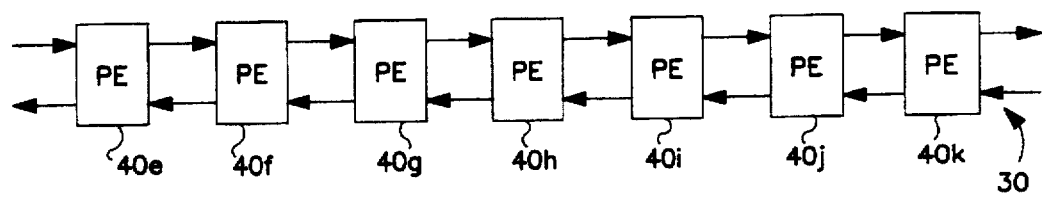

FIGS. 7A and 7B are data flow diagrams which show an exemplary mapping of the edit distance components shown in FIG. 6 to the respective processing elements in which they are computed.

Figure 1:
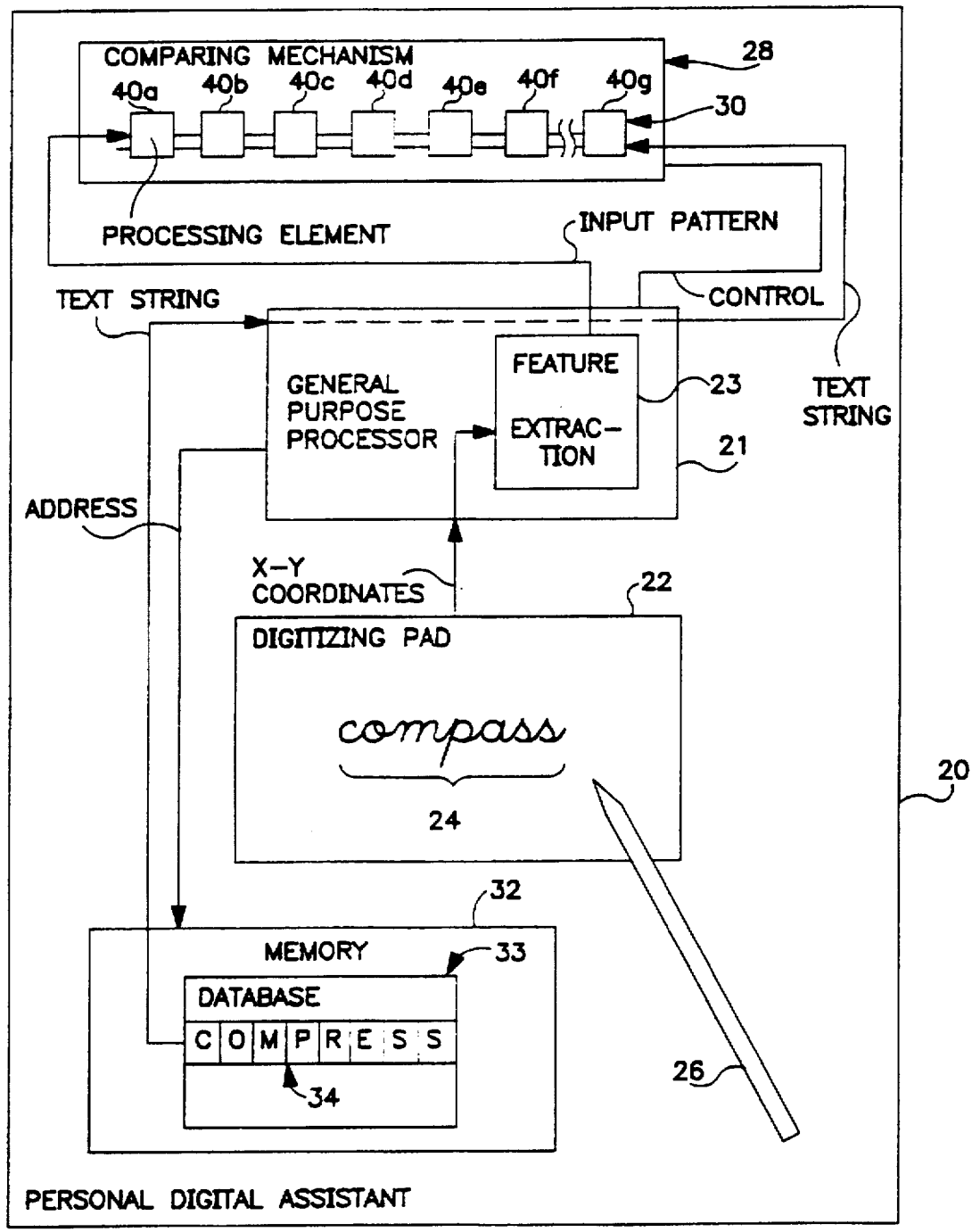
FIG. 1 is a block diagram of an exemplary electronic handwriting matching system according to the invention.
Figure 8A:
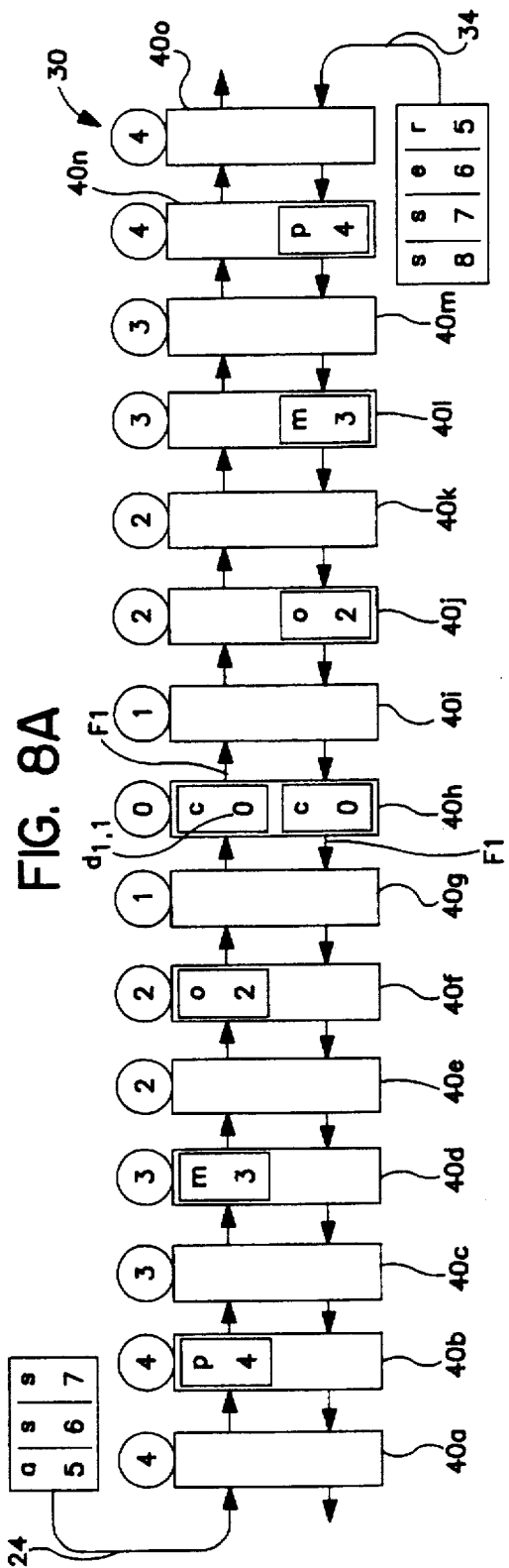
Figure 8B:
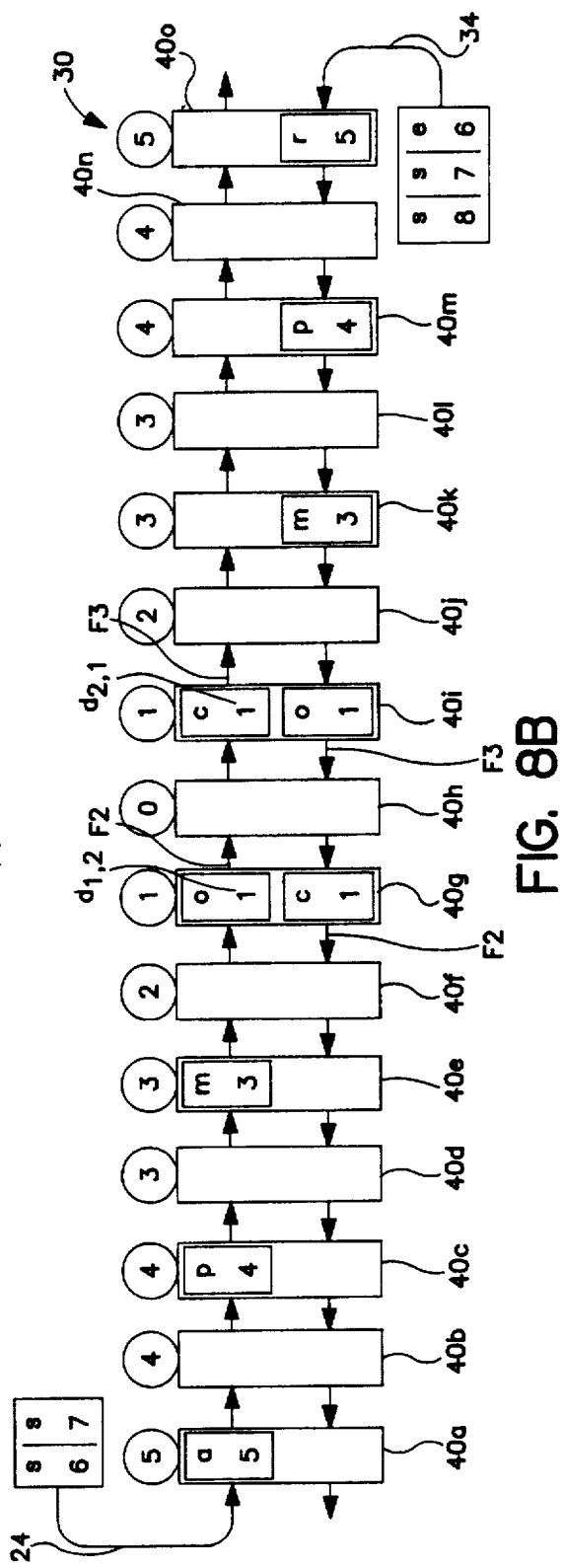
Figure 8C:
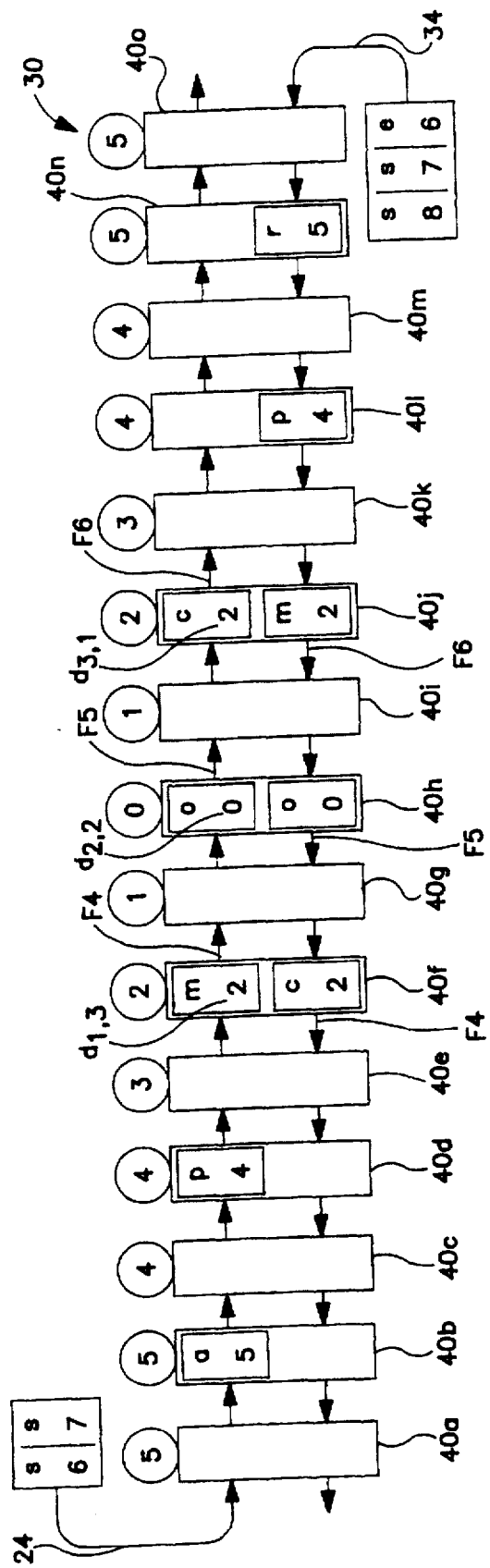

FIGS. 8A–8C are block diagrams of the systolic array shown in FIG. 1, showing the propagation of the pattern and text strings through the array over time.

Figure 9:
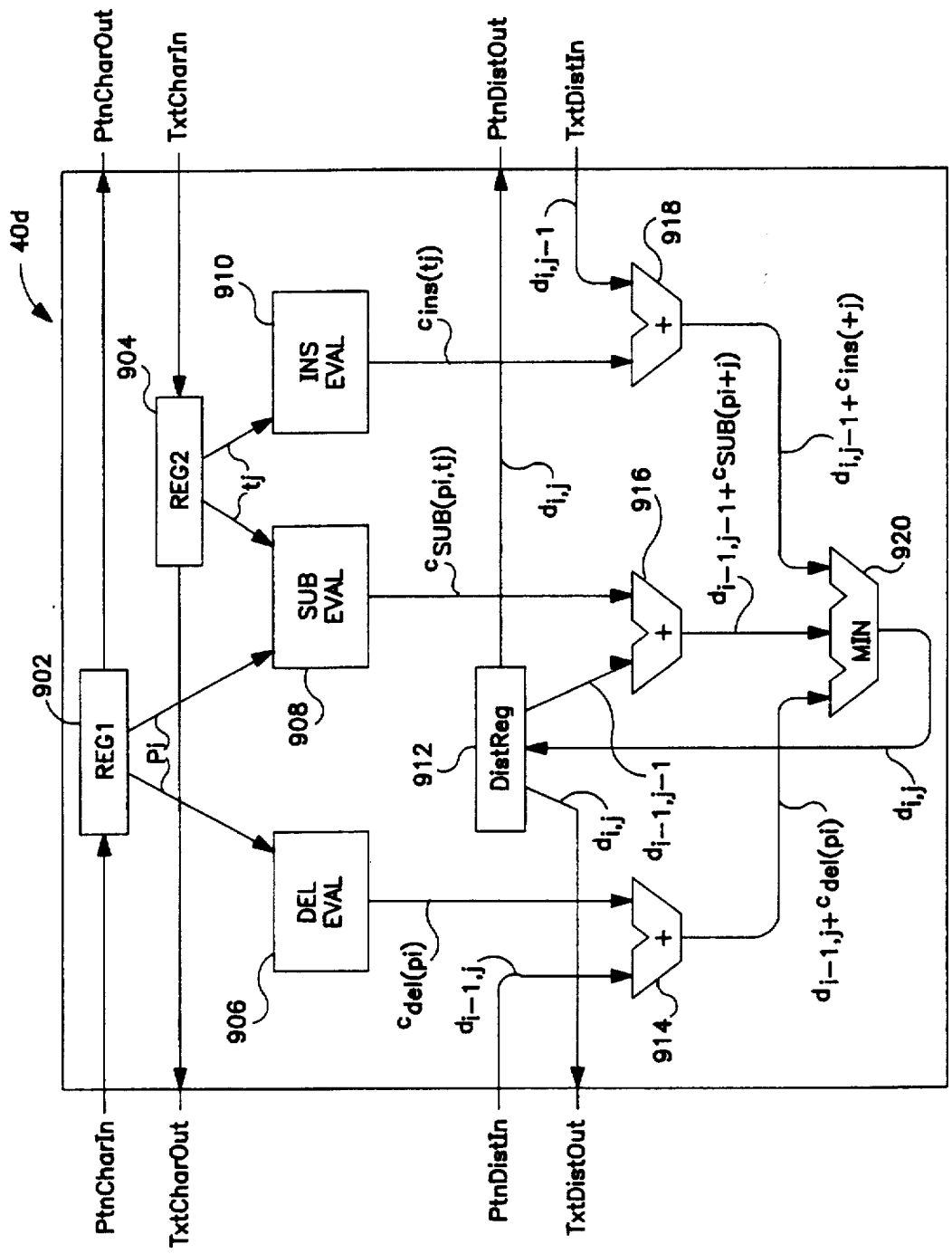

FIG. 9 is a block diagram of an exemplary processing element as shown in FIG. 1.

Figure 10:
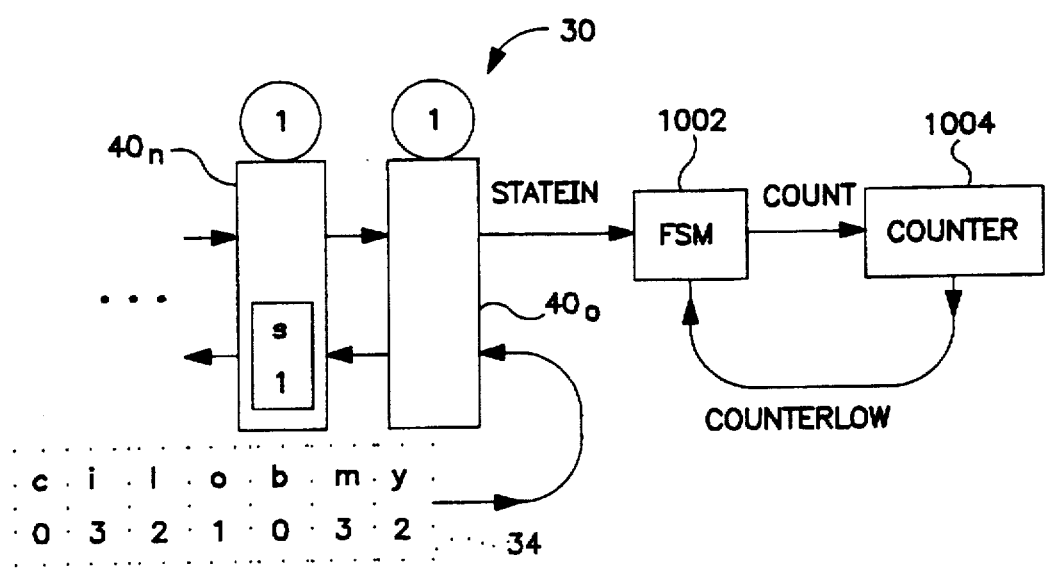

FIG. 10 is a block diagram of exemplary logic for reconstructing the final edit distance if the processing elements shown in FIG. 9 use truncated edit distance values.

Figure 11A:
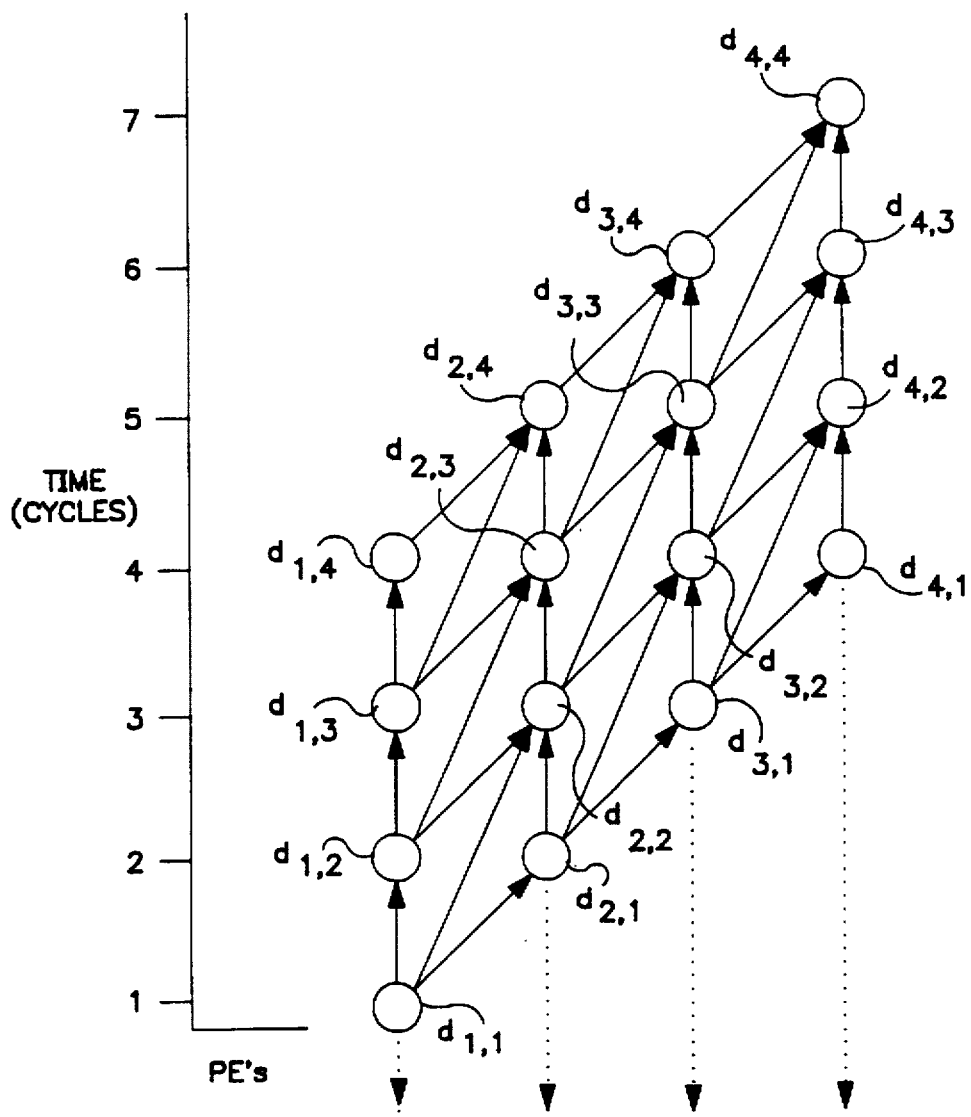
Figure 11B:
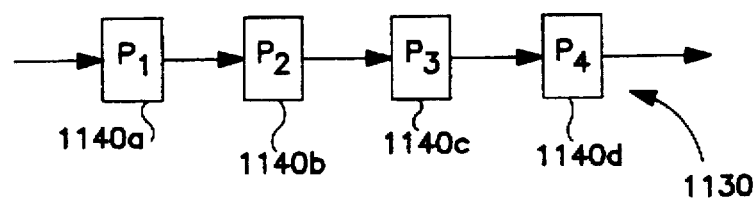

FIGS. 11A and 11B are data flow diagrams which show a second exemplary mapping of the edit distance components shown in FIG. 6 to the respective processing elements within a second exemplary systolic array, shown in FIG. 11B.

Figure 12:
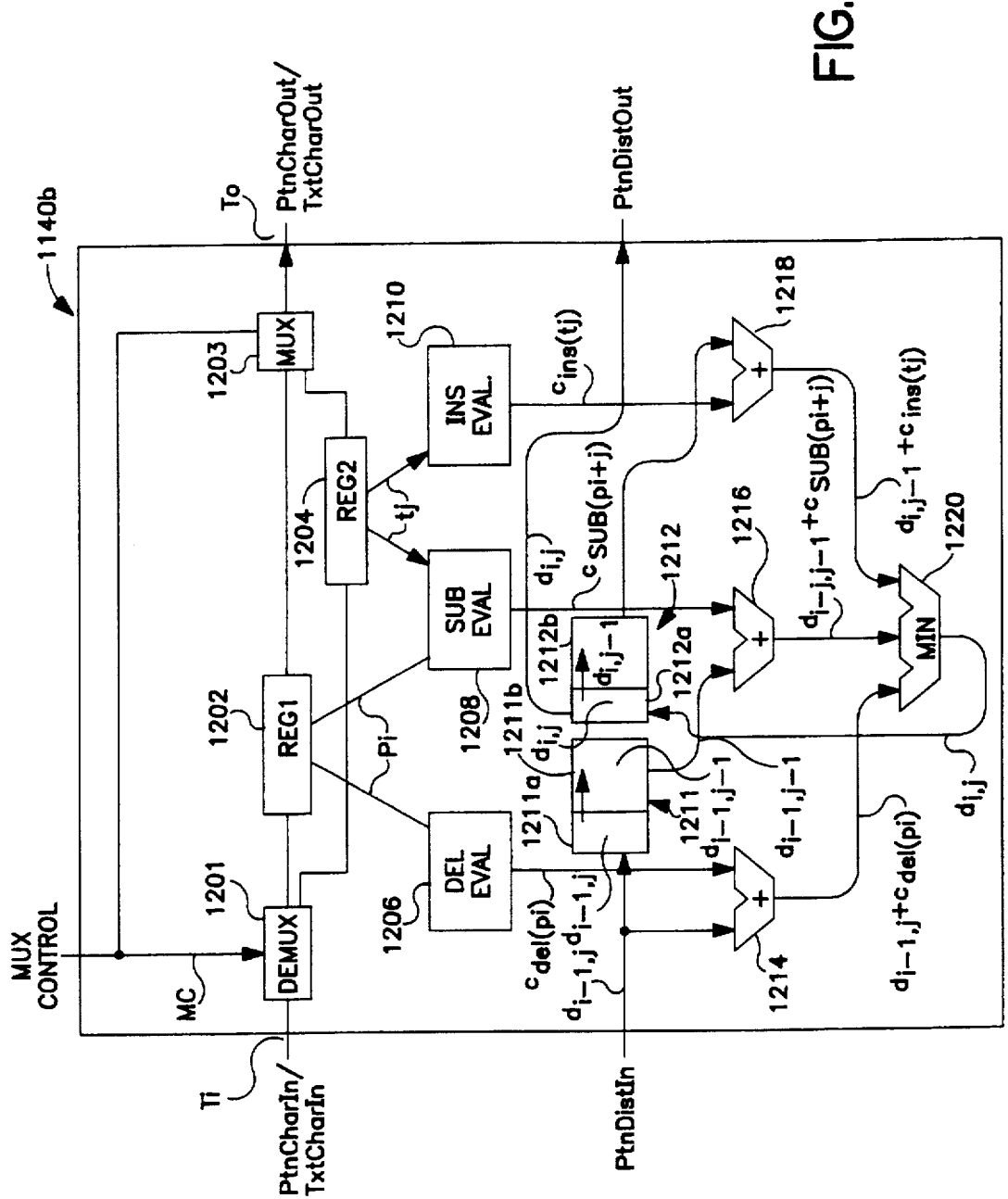

FIG. 12 is a block diagram of the exemplary processing element shown in FIG. 11B.

Figure 4:
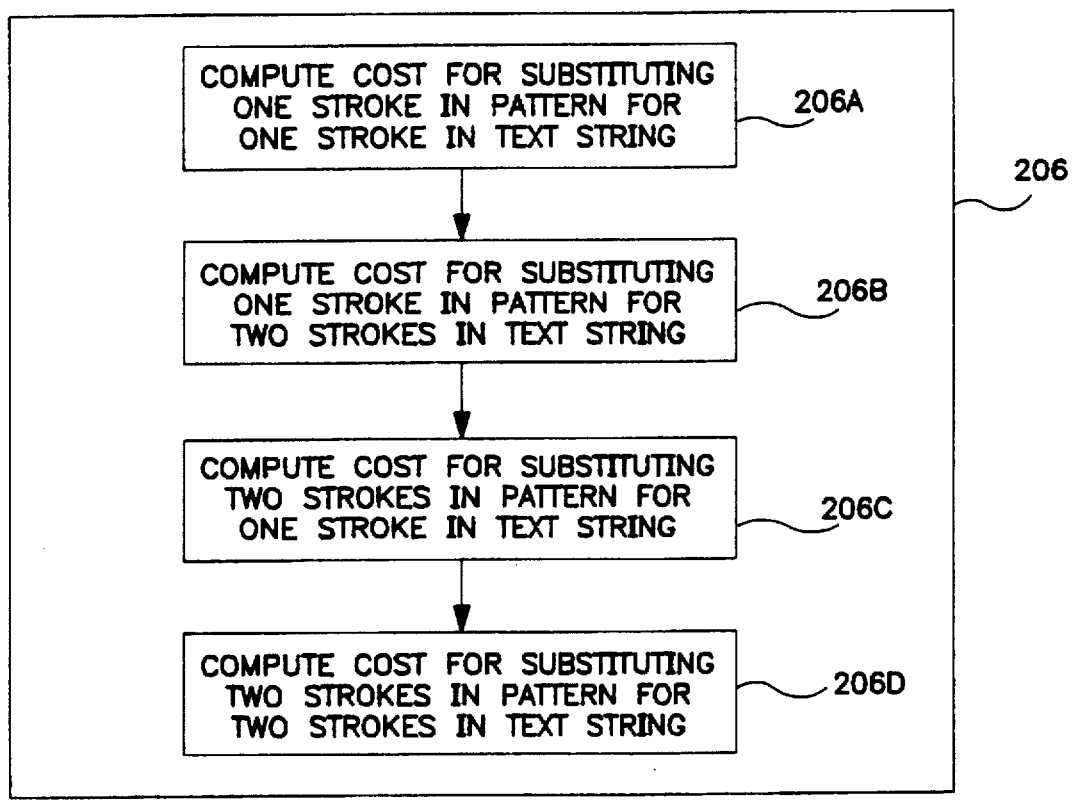
FIG. 4 is a flow chart diagram showing details of the step of computing the substitution edit cost component, as shown in FIG. 2.
Figure 13A:
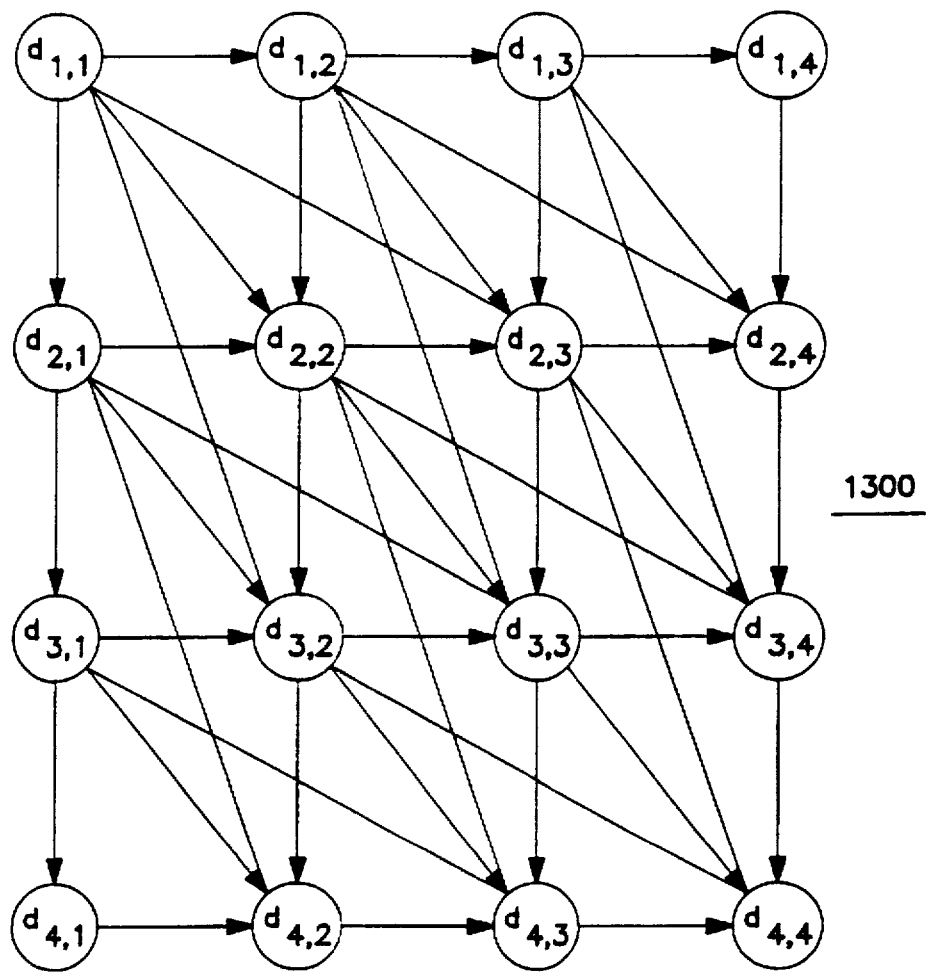

FIG. 13A is a second data flow diagram showing the relationships between the edit distance components computed in FIG. 4.

Figure 13B:
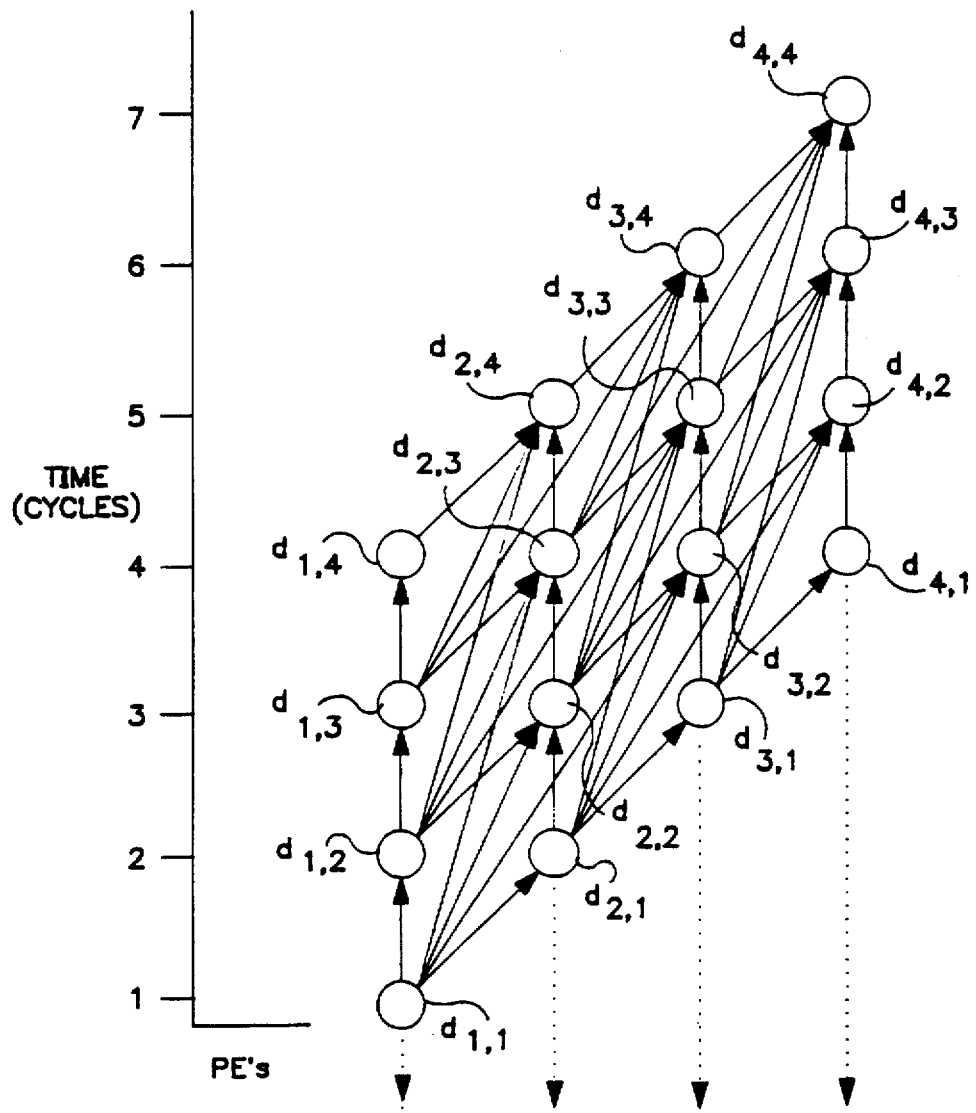
Figure 13C:
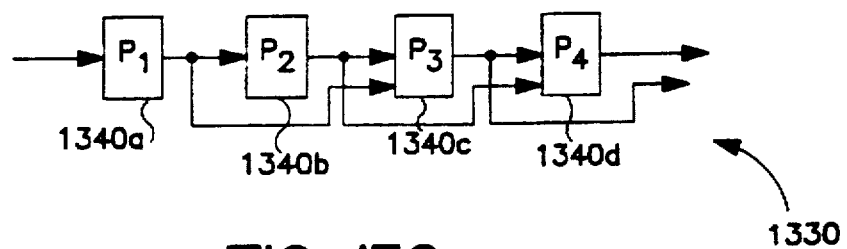

FIGS. 13B and 13C are data flow diagrams which show an exemplary mapping of the edit distance components shown in FIG. 13A to the respective processing elements within a third exemplary systolic array, shown in FIG. 13C.

Figure 14:
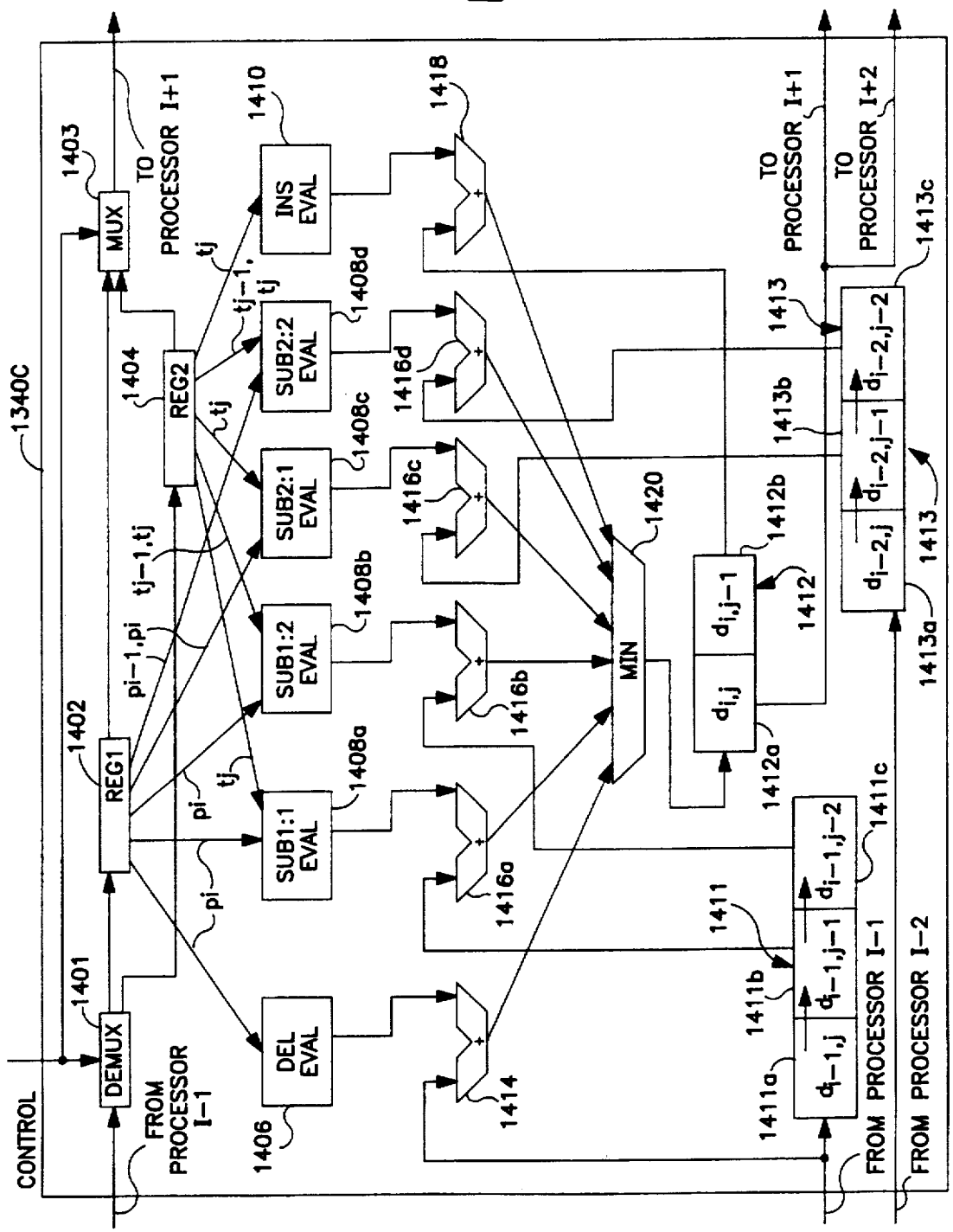

FIG. 14 is a block diagram of the exemplary processing element shown in FIG. 13C.

OVERVIEW

FIG. 1 is a block diagram of an exemplary electronic handwriting matching system according to the invention, for comparing an input pattern to a plurality of known text strings.

Throughout this description, the term "pattern" is used to denote a sequence of symbols input in a query, and the term "text" is used to denote a predetermined stored sequence of symbols in a database. One of ordinary skill in the art will understand that the input sequence of symbols and the predetermined stored sequence of symbols need not represent textual character data. The symbols may be combined to form equations, drawings or other non-textual writings. For purpose of brevity, the terms "pattern" and "text" are used to denote the query input sequence and the stored database sequences, respectively; these terms are typically used in the same way in the literature dealing with character matching.

In the exemplary embodiment, the handwriting matching system is included in a personal digital assistant (PDA) 20 that has a digitizing pad 22 for entering patterns 24 using a stylus 26. In FIG. 1, the pattern *compass* is shown. The PDA 20 has a general purpose processor 21. The general purpose processor 21 receives the X–Y coordinates from the digitizing pad 22. The ink is broken into strokes (still using X–Y coordinates) based on y-minima. A pen-stroke is defined as a subset of the points on a page which is identified as representing one of the strokes in a predetermined alphabet of strokes. The processor 21 includes a feature extraction function 23, which may be implemented in software. The feature extraction function 23 extracts a plurality of real-valued components (e.g., length of the stroke) from the stroke data. Then vector quantization is performed using Mahalanobis distance to form strings (sequences of strokes) over an alphabet of a small number of possible stroke types.

In one example, feature extraction function 23 extracts 13 components, and the alphabet includes 64 stroke types. The invention is not limited to this combination, and different numbers of components and stroke types may be used.

The PDA 20 also includes a memory 32, in which a database 33 is stored. The database 33 includes a plurality of text strings 34. The processor 21 controls the memory 32 to transmit each of the plurality of text strings 34 to processor 21, which in turn transmits them to a special purpose processor 28. The input pattern is also transmitted from the general purpose processor 21 to the special purpose processor 28. Processor 28 compares the input pattern to each of a plurality of stored text strings 34.

According to the invention, traditional handwriting recognition (HWX) may be deferred or even eliminated. Instead, the pattern is compared to known text strings 34 using edit distance computations. Because exact matches between the pattern and the known text are not expected to occur, approximate string matching (i.e., edit distance) is the appropriate model to use in this case.

A cost is associated with each edit operation. Using a dynamic programming algorithm, the minimum-cost set of operations that performs the desired edit is determined. The cost of this set of operations is the edit distance between the two strings, and provides a measure of their similarity. A small edit distance means that the strings are quite close (similar), and a large edit distance means that the strings are very different.

The PDA 20 includes a memory 32 in which a plurality of known text strings 34 are stored. Each text string includes a respective group of strokes. The handwriting matching system includes a mechanism 28 for comparing the electronic handwritten pattern 24 to the plurality of stored text strings 34.

Comparing mechanism 28 compares the sequence of strokes in the pattern 24 to each one of the plurality of stored text strings 34. The comparing mechanism 28 determines which of the plurality of stored text strings 34 most closely matches the sequence of strokes. The comparing mechanism 28 includes a linear systolic array processor 30 which determines a respective edit distance between each one of the plurality of text strings 34 and the sequence of strokes in the pattern 24.

The comparing mechanism 28 compares a portion of each one of the text strings 34 to a corresponding portion of the sequence of strokes of the pattern 24. Whenever a portion of the text string 34 differs from the corresponding portion of the pattern, there is an "edit cost" associated with the differing portion. This step is repeated for each stroke within the text string 34, to compute the total edit distance for the string. The procedure is executed once for each string.

The linear systolic array processor 30 of the first exemplary embodiment comprises a plurality of processing elements 40a–40o connected in a line. Although FIG. 1 only shows seven processing elements 40a–40f and 40o for brevity, any number of processing elements may be used to accommodate any desired pattern size. The strokes in the sequence of strokes of pattern 24 are successively transmitted across the line of processing elements 40a–40o in a first direction, while the corresponding strokes within one of the text strings 34 are successively transmitted across the line of processing elements 40o–40a in a second direction opposite the first direction. Each processing element 40a–40o compares the pattern stroke it is currently receiving to the text string stroke it is currently receiving.

For example, in FIG. 1, the text string 34 is transmitted from the rightmost processing element 40o to the leftmost processing element 40a; the pattern 24 is transmitted from the leftmost processing element 40a to the rightmost processing element 40o.

Figure 2:
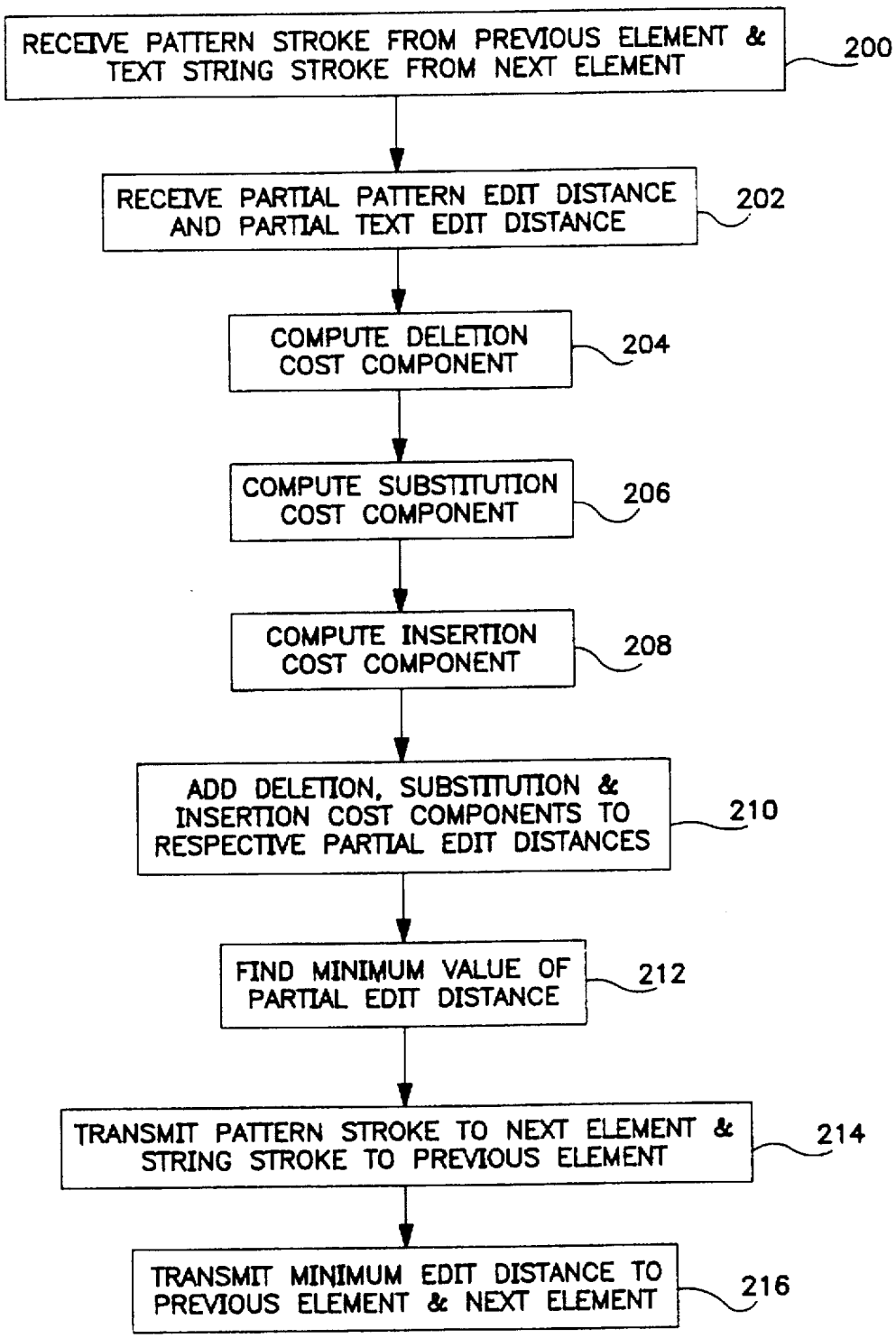
FIG. 2 is a flow chart diagram showing the main steps executed by each processing element 40a–40f of systolic array processor 30 shown in FIG. 1.

FIG. 2 is a flow chart diagram showing the main steps executed by each processing element 40a–40f of systolic array processor 30. Although the method shown in FIG. 2 is executed in each respective processing element 40a–40f, for the sake of brevity, the example described herein focuses on the steps executed within one element 40d, while processing a single one of the plurality of text strings 34.

At step 200, the processing element 40d receives one of the strokes in the pattern 24 from the previous processing element 40c, and also receives one of the strokes in the text string 34 from the next processing element 40e. At step 202, the processing element 40d also receives a partial "pattern edit distance" value from previous processing element 40c, and a partial "text edit distance" value from the next processing element 40e.

In steps 204, 206 and 208, the systolic array processor 30 generates a plurality of edit sequence components based on the comparing. Each edit sequence component identifies a respectively different operation or set of operations (deletion, substitution and insertion, respectively) that transforms the portion of the text string into the corresponding portion of the pattern. Each edit sequence component has a respective edit distance component, or edit cost, which quantitatively defines the size of the change needed to transform the portion of the text string into the corresponding portion of the pattern using the set of operations corresponding to that edit sequence component.

At step 204, the processing element 40d computes the "edit cost" of deleting (omitting) a stroke from the pattern 24, so that the text string 34 matches the pattern after omitting the deleted stroke from the pattern.

At step 206, the processing element 40d computes the "edit cost" of substituting a stroke in the text string 34 for the corresponding stroke in the pattern 24. If the text string stroke exactly matches the pattern stroke, then the substitution cost computing mechanism assigns an edit cost of zero. If the text stroke and pattern stroke differ, then the substitution edit cost is greater than zero.

At step 208, the processing element 40d computes the insertion edit cost. This is the cost of inserting an additional stroke in the text string, so that it matches the pattern.

At step 210, when each possible edit cost is computed for transforming the portion of the text string 34 into the corresponding portion of the pattern 24, that edit cost is added to the respective partial edit distance component received at step 200. At step 212, the minimum value is selected from the three partial edit distance values determined at step 210. This minimum value is stored within the processing element 40d for later use. At step 214, the pattern stroke is transmitted to the next processing element 40e, and the text string stroke is transmitted to the previous processing element 40c. This minimum value is transmitted to the previous processing element 40c and the next processing element 40e at step 216.

Several parallel systolic array architectures are suitable for this type of computation. These arrays may be implemented in a variety of technologies, including custom VLSI and field-programmable gate arrays (FPGA's), and offer orders of magnitude speed-up over software (uniprocessor) approaches.

Whereas prior art pattern recognition techniques assumed a fixed character set (e.g., ASCII), a matching system according to the present invention is language-independent as it is based entirely on electronic ink, and not a specific character set or language. The same components (including systolic array processor 28) and methods may be used for matching English, Japanese, Spanish, etc. Moreover, to the extent that a user's non-textual writing obeys a linear stroke order, the same apparatus would work for equations and drawings, and would not be limited to text.

Details of the method and architecture are described below with reference to the exemplary embodiments.

DETAILED DESCRIPTION

BASIC PATTERN/STRING COMPARISON

The problem of determining the relationship between two strings that are similar but not necessarily identical is modeled as an edit distance computation. A set of basic operations are used to change ("edit") one string into the other (for example, to edit a given text string till it matches the pattern).

In some applications, the actual operations used to perform the edit are also important. These may be obtained by recording the optimal decisions made during the dynamic programming procedure. The pattern and text strings may both be roughly the same length, or the text may be much longer than the pattern. The latter case arises when searching for a close match in a stream of data (this is referred to hereafter as "word-spotting").

The terms "symbol" and "pen-stroke" are used interchangeably hereafter in the description of the edit distance computation. Furthermore, it is convenient to visualize each stroke or set of strokes as a symbol or character in the English alphabet; FIGS. 3, 5 and 8A–8C show English characters for ease of visualization. This is for the convenience of the reader; however, one of ordinary skill in the art understands that the symbols/strokes described herein are generally not English characters; the term "stroke" as defined herein covers lower level pattern components, which may be line segments, arcs, or feature vectors. In any event, these are the elements of an alphabet $\Sigma$ of predefined symbols, each symbol defining a line segment or arc.

Conventional edit distance computations permit the following three operations:

1. delete a stroke (symbol);
2. insert a stroke(symbol); or
3. substitute one stroke (symbol) for another.

Each of these edit operations is assigned a cost or partial edit distance component, $c_{del}$, $c_{ins}$, and $c_{sub}$, respectively. The total edit distance, $d(P, T)$, is defined as the minimum cost of any sequence of basic operations that transforms the whole pattern P into the whole text string T. This optimization problem may be solved using a well-known dynamic programming algorithm. Let $P=p_1, p_2, \ldots, p_m$, $T=t_1, t_2, \ldots, t_n$, and define $d_{i,j}$ to be the distance between the first i symbols of P and the first j symbols of T. Note that $d(P, T)=d_{m,n}$. The initial conditions are:

$$d_{o,o}=0 \tag{3}$$

$$d_{i,0}=d_{i-1,0}+c_{del}(p_i)\ 1\leq i\leq m \tag{4}$$

$$d_{0,j}=d_{0,j-1}+C_{ins}(t_j)\ 1\leq j\leq n \tag{5}$$

and the main dynamic programming recurrence is:

$$d_{i,j} = \min \begin{Bmatrix} d_{i-1,j} + c_{del}(p_i) \\ d_{i,j-1} + c_{ins}(t_j) \\ d_{i-1,j-1} + c_{sub}(p_i,t_j) \end{Bmatrix} \quad 1 \leq i \leq m, 1 \leq j \leq n \quad (6)$$

When Equation 6 is used as the inner-loop step in a software implementation, the time required is O(mn) where m and n are the lengths of the two strings. The string lengths m and n may be very long; hence a software implementation may be quite slow. The hardware embodiments of FIGS. 7B–14 (discussed in detail below) provide enhanced speed for these computations.

Figure 3:
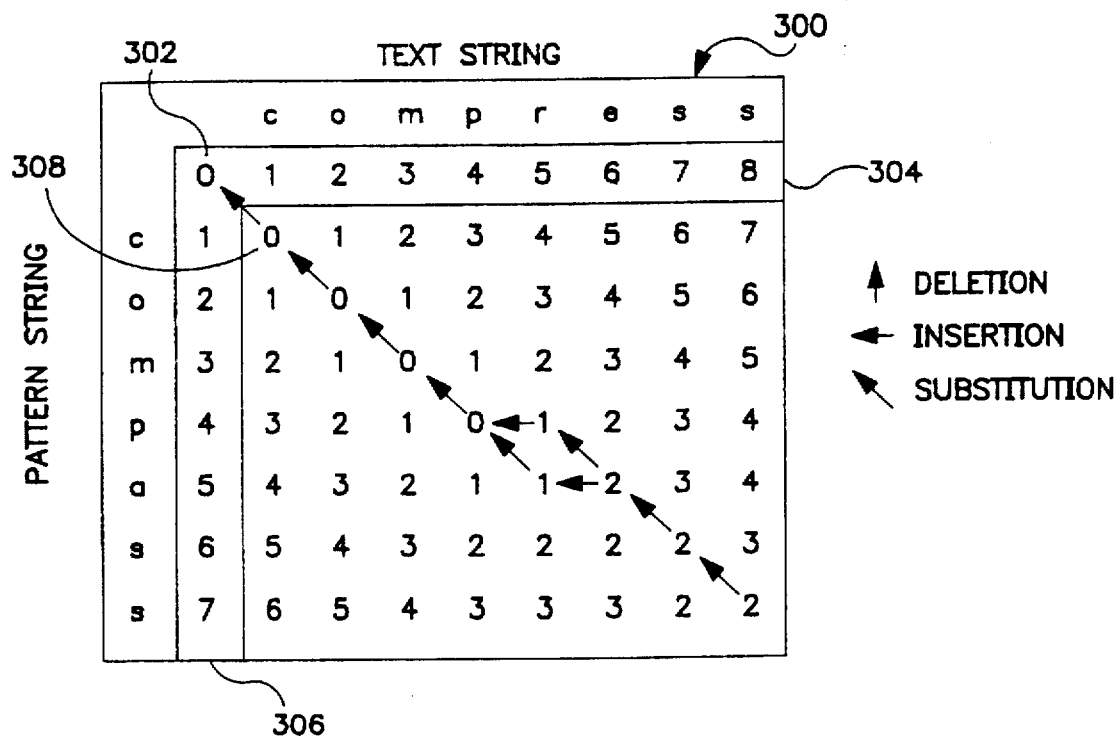
FIG. 3 is an edit distance table computed using the method of FIG. 2.

FIG. 3 is a table showing an example of an edit distance computation using equations (3) to (6). The text string "compress" is compared to the input pattern "compass." Evaluating the recurrence results in a two dimensional table 300 of distance values. For purposes of generating table 300, the following cost assignments are used: $C_{del}=1$; $C_{ins}=1$; and $c_{sub}(P_i, t_j)=0$ if $p_i=t_j$ and 1 otherwise.

Equation 3 defines value 302. Equation 4 defines the values of $d_{ij}$ for the first column 306. Equation 5 defines the values of the first row 304. The recurrence relation of equation (6) is executed to fill the remainder of table 300, either by executing the inner loop for each row and the outer loop for each column, or vice versa. Executing equation (6) corresponds to performing steps 204, 206, 208, 210 and 212 of the method of FIG. 2. The final minimum edit distance for the text string "compress", in this case 2, is found in the lower right corner.

FIG. 3 also shows the two optimal editing paths and their respective interpretations in terms of the basic deletion, substitution and insertion operations. The arrows in FIG. 3 indicate the minimum edit distance path. For example, the arrow from value 308 of $d_{1,1}$ points to value 302 of $d_{0,0}$, because the substitution cost from $d_{0,0}$ to $d_{1,1}$ is less than the deletion cost or the insertion cost (The substitution cost is 0 when the pattern stroke and the corresponding text stroke match).

HANDLING SEGMENTATION ERRORS

A common type of ambiguity introduced by the matching process involves the segmentation of larger connected components (ink) into individual symbols. Analogizing to optical character recognition (OCR), in OCR the string "modem" might be read as "modern", with the last "m" having been broken into an "r" followed by an "n". Similarly, two pen strokes might be improperly merged if the associated pen-up/pen-down event is missed. For example, the two strokes "(" and ")" might be mistaken for an arc "⌒", if placed close together. Rather than treat such situations as two separate edit events (a substitution and an insertion in the first case, a substitution and a deletion in the second), it makes much more sense to consider them to be a special form of substitution. This is accomplished by supplementing the operations of equation (6) with the following operations:

4. split one symbol into two,
5. merge two symbols into one,
6. substitute two symbols for two others.

The costs for these are $C_{sub1:2}$, $C_{sub2:1}$, and $c_{sub2:2}$, respectively. The recurrence from Equation 6 is then replaced by:

$$d_{i,j} = \min \begin{Bmatrix} d_{i-1,j} + c_{del}(p_i) \\ d_{i,j-1} + c_{ins}(t_j) \\ d_{i-1,j-1} + c_{sub1:1}(p_i,t_j) \\ d_{i-1,j-2} + c_{sub1:2}(p_i,t_{j-1}t_j) \\ d_{i-2,j-1} + c_{sub2:1}(p_{i-1}p_i,t_j) \\ d_{i-2,j-2} + c_{sub2:2}(p_{i-1}p_i,t_{j-1}t_j) \end{Bmatrix} \quad 1 \leq i \leq m, 1 \leq j \leq n \quad (7)$$

FIG. 4 is a flow chart diagram showing how the substitution cost computation of step 206 (FIG. 2) may comprise computation of four different components to accommodate the three types of segmentation errors in equation (7). At step 206A, the cost is computed for substituting one symbol in the pattern for one symbol in the text string (e.g., "/" instead of "("). At step 206B, the cost is computed for substituting one symbol in the pattern for two symbols in the text string (e.g., "⌒" instead of "( )"). At step 206C, the cost is computed for substituting two symbols in the pattern for one symbol in the text string (e.g., "( )" instead of "⌒"). At step 206D, the cost is computed for substituting two symbols in the pattern for two symbols in the string (e.g., "⌉⌈" instead of "| |").

While the difference between equation (6) and equation (7) may appear minor, it yields a more accurate model of the ambiguity introduced during symbol (or stroke) segmentation.

WORD SPOTTING

An important variation on the basic string matching problem concerns searching for a substring in a much longer string. For example, T might represent a "database" of handwritten notes, and P a word or phrase that the user wishes to find within it. In this case, In equation (6) is not appropriate as it requires the two strings to be aligned in their entirety. Because the text string is assumed to be longer than the pattern (n>>m), the edit distance between the pattern and the full text string is large regardless of whether (or where) the strokes of the pattern occur within the text string.

According to the invention, another small modification to the dynamic programming algorithm solves this problem. For this problem, it does not matter where within the text string the match begins or ends; the user simply wants the best match anywhere within the text string. All the values of the initial edit distance row are set to 0 along the entire length of the text string, (allowing the match to start anywhere). The final row of the edit distance table is searched for the smallest value (allowing the match to end anywhere). The initial conditions become:

$$d_{o,o}=0 \quad (8)$$

$$d_{i,o}=d_{i-1,o}+c_{del}(p_i) \quad (9)$$

$$d_{o,j}=0 \quad (10)$$

where $1 \leq i \leq m$.

The inner-loop recurrence (i.e., Equation (6) or (8) ) remains the same.

Figure 5:
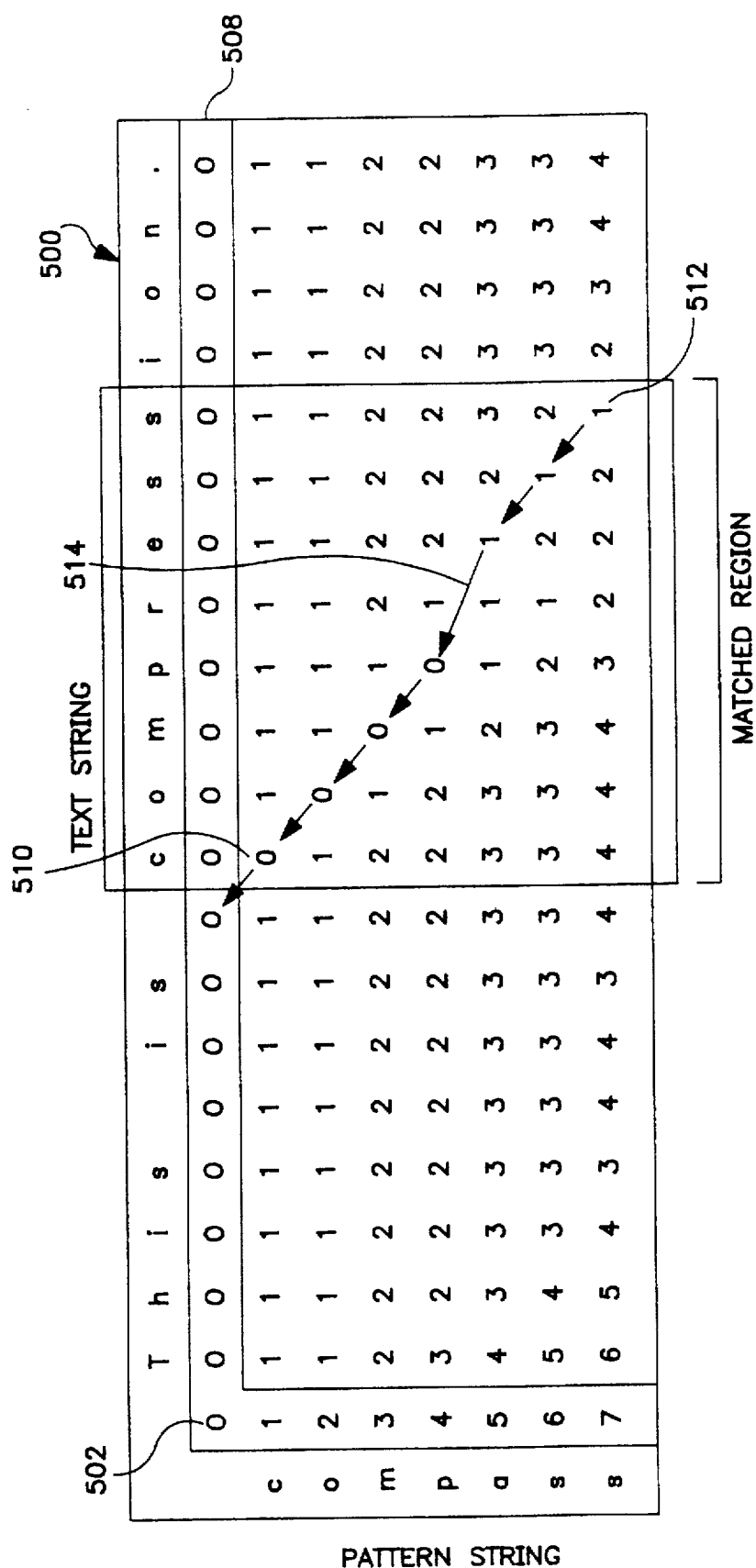
FIG. 5 is a second exemplary edit distance table computed using the method of FIGS. 2 and 4.

FIG. 5 is a table 500 showing an example of word-spotting using equations (7) to (10) to find the pattern, "compass", in the text string, "This is compression." As noted above, according to the invention, the actual comparison is between the individual strokes in the text and pattern strings, not the letters; the table shows letters for ease of visualization by the reader. The specific edit costs used are $c_{del}=c_{ins}=1$, $c_{sub1:1}=1$, $C_{sub1:2}=1$, $c_{sub2:1}=1$, and $C_{sub2:2}=2$.

According to equation (10), the entire row 508 of values $do_{0,j}$ 502 are set to 0. Thus, a comparison between the "c" in "compression" and the "c" in "compass" results in an edit distance value 510 of zero, instead of a value of eight that would be produced if equation (5) is used.

Another difference between the methods of FIGS. 3 and 5 is that in FIG. 5, a single edit operation (shown by arrow 514) accounts for the difference between the symbol "a" in "compass" and the symbols "re" in "compression". This feature of the method of FIG. 5 accommodates segmentation errors. In the example shown, the substitution of "re" for "a" is handled as a segmentation error. During the matching process, it is impossible to say with certainty whether a given "event" is a "segmentation error" or some other type of phenomenon. The exemplary method accommodates 1:2, 2:1 and 2:2 substitutions, without requiring certainty as to whether a given "event" is actually a "segmentation error."

This is appropriate for the word search problem, because the pattern is not being compared to a plurality of potentially similar text strings. Instead, the word search problem involves comparison between the pattern and a plurality of substrings, most of which are expected to differ from the pattern.

In the example of FIG. 5, the best match ends with the distance value of 1 in item 512 of the last row of table 500 (corresponding to the last "s" in "compression"). The minimum edit distance edit path traces back from value 512 to value 510 at the beginning of the word "compression". Hence, the best match for the query pattern "compass" in the text string "This is compression," is "compress", with an edit distance of 1.

In some cases, the pattern string appears more than once within the full text string, or a number of substrings similar to the pattern appear within the text string. One of ordinary skill in the art will understand that any number of close matches may be located by scanning the last row of the table and returning indices that fall below a certain threshold.

Although the methods of FIGS. 3 and 5 may be relatively computation-intensive for long strings (they require time O(mn)), there is a family of parallel systolic array architectures that perform well for these computations. Due to their uniform local data-flow and an important feature (described below with reference to FIGS. 9 and 10) that greatly simplifies the dynamic programming arithmetic, these arrays are relatively straightforward to build, achieve high processor densities, and are very fast. Systolic array processors used for comparing DNA sequences have been benchmarked several orders of magnitude faster than software-only solutions running on general-purpose computers. The following section describes an exemplary architecture.

THE BASIC SYSTOLIC ARCHITECTURE

FIG. 6 is a data flow diagram of the recurrence relation of the dynamic programming method of Equation (6). In FIG. 6, the nodes (i.e.: $d_{1,1}, \ldots, d_{1,4}; d_{2,1}, \ldots, d_{2,4}; d_{3,1}, \ldots, d_{3,4};$ and $d_{4,1}, \ldots, d_{4,4}$) correspond to the edit distance values computed by systolic array processor 30. Arrows (e.g., 611a–611c, 612a–612c, 613a–613c, ... 633a–633c, 641a, 642a, 643a, 614c, 624c and 634c) represent the flow of data as the computation progresses. For example, as shown in FIG. 6, computation of $d_{2,2}$ requires the values of $d_{1,1}, d_{1,2},$ and $d_{2,1}$, transmission of which are represented by data flows 611b, 612c, and 621a, respectively. FIG. 6 only shows the edit distance components and data flows for the first four symbols of the pattern and text string. One of ordinary skill in the art could readily extend FIG. 6 to include more columns for a longer text string and/or more rows for a longer pattern.

FIGS. 7A and 7B show a mapping of the data-dependence graph of FIG. 6 onto a linear systolic array 30 (shown in FIGS. 1 and 7B) according to the first exemplary embodiment of the invention. FIGS. 7A and 7B enable visualization of the mapping of the computation steps onto the linear systolic array 30.

FIG. 7A differs from FIG. 6 in that the nodes in FIG. 6 represent specific edit distance components $d_{i,j}$, $0 \leq i \leq m$, $0 \leq j \leq n$, generally. The nodes in FIG. 7A represent the assignment of specific edit distance component computations to specific processing elements 40e–40k at specific points in time; any given processing element 40e–40k contains different edit distance components $d_{i,j}$ at different points in time. Similarly, the arrows F1–F15 indicate how the transmission F1 of an edit distance component $d_{1,1}$ from processing element 40h affects edit distance computations in other processing elements over time.

The first edit distance component value $d_{1,1}$ is computed in the middle processor (which is processing element 40h in the exemplary systolic array 30 shown in FIG. 7B) at time 1. This value $d_{1,1}$ is then transmitted (as shown by the data flow F1) to the adjacent processing elements, 40g and 40i, respectively, which use $d_{1,1}$ for computing $d_{1,2}$ and $d_{2,1}$. Element 40h retains the value of $d_{1,1}$ for use in computing $d_{2,2}$. At time 2, processing element 40g computes $d_{1,2}$ and transmits $d_{1,2}$ to processing elements 40f and 40h (shown by data flow F2). Also at time 2, processing element 40i computes $d_{2,1}$ and transmits $d_{2,1}$ to processing elements 40h and 40j (shown by data flow F3).

At time 3, processing element 40h uses the retained value of $d_{1,1}$ and the received values of $d_{1,2}$ and $d_{2,1}$ to compute the value of $d_{2,2}$. The value of $d_{2,2}$ is then retained by element 40h, and transmitted to elements 40g and 40i, as shown by data flow F4. One of ordinary skill in the art could readily trace the rest of the data flows and edit distance components shown in FIGS. 7A and 7B. For example, by reference to FIGS. 7A and 7B, one of ordinary skill would recognize that the component $d_{2,3}$ is computed by processing element 40g at time 4.

FIGS. 7A and 7B only show the edit distance components and data flows for the first four symbols of the pattern and text string. One of ordinary skill in the art could readily extend FIGS. 7A and 7B to include more processing elements and/or more time for a longer pattern. To compare a pattern of length m to a string of length n, a minimum of $m+n-1$ processors are used. For example, to compare the pattern "compass" and the text string "compress", as shown in FIG. 3, 14 processing elements could be used. To show all of the processing steps, FIG. 7A would be extended to time 14, which is the time when the last "s" in "compass" meets the last "s" in "compress" in the central processing element 40h.

FIGS. 8A–8C show three consecutive "snapshots" of a portion of the array 30 while comparing the text string "compress" 34 to the pattern "compass" 24. The example of FIGS. 8A–8C is described with reference to the basic pattern/string comparison method described above with reference to FIG. 3, using the architecture shown in FIGS. 7A and 7B employing 15 processing elements.

As shown in FIGS. 8A–8C, the pattern string 24 flows in from the left side of the array 30, and the text string 34 flows in from the right. Above each respective processing element 40a–40o, a distance value from the first column and row of the dynamic programming table 300 (i.e., the initial condition) is indicated within a circle. When two symbols meet in a processor, a comparison is performed, and the distance values are updated using Equation 6.

FIG. 8A shows the array 30 at the time 1 when the edit distance component $d_{1,1}$ is computed in processing element 40$h$. Flow F1 transmits the value $d_{1,1}$ to processing elements 40$g$ and 40$i$.

As the computation progresses, more and more updates are performed in parallel. For example, at time 7, all seven (7) of the processing elements 40$e$–40$k$ shown in FIG. 7B are simultaneously computing the values of $d_{1,7}$, $d_{2,6}$, $d_{3,5}$, $d_{4,4}$, $d_{5,3}$, $d_{6,2}$ and $d_{7,1}$, respectively.

As the symbols exit from the opposite sides of the array, they carry with them the last row and column of the dynamic programming table (and hence the final edit distance). Thus, when the "c" in "compass" exits processor 40$o$, it carries with it the value of $d_{1,8}=7$. When the "o" in "compass" exits processor 40$o$, it carries with it the value of $d_{2,8}=6$. The whole last column is transmitted from processing element 40$o$, up to $d_{7,8}=2$. When the "c" in "compress" exits processing element 40$a$, it carries with it the value of $d_{7,1}=6$. When the "o" in "compress" exits processing element 40$a$, it carries with it the value of $d_{7,2}=5$. The whole last row is transmitted from processing element 40$a$, up to $d_{7,8}=2$.

If p is the length of the systolic array 30, then up to (p+1)/2 processors are active simultaneously. To compare the pattern 24 and string 34 in their entirety, m+n−1 processors are required. The complete computation requires p+2*max(m, n)−1 steps. Hence, the time required to perform the comparison is of the order O{max(m,n)}, and is linearly related to the sizes of the pattern 24 and text 34. In contrast, using a single processor to perform all of the comparisons sequentially requires an amount of time which varies quadratically in terms of m and n. Moreover, a special-purpose systolic array implementation of the algorithm may be designed to perform all of the steps required by Equation (6), or equation (7), in a single clock cycle, whereas a general-purpose computer may require 10's or 100's of machine-level instructions to accomplish the same computation.

FIG. 9 is a block diagram of an exemplary processing element 40$d$ for the systolic array 30 shown in FIGS. 1, 7B and 8A–8C. Processing element 40$d$ comprises several simple registers and functional units. The incoming pattern symbol and incoming text symbol are stored in registers 902 and 904, respectively. The pattern symbol in register 902 is transmitted to the deletion cost evaluation block 906 and the substitution cost evaluation block 908. The text string symbol in register 904 is transmitted to the substitution cost evaluation block 908 and the insertion cost evaluation block 910.

The deletion cost evaluation block 906, substitution cost evaluation block 908, and insertion cost evaluation block 910 evaluate the costs of a deletion, insertion, and substitution, respectively. As noted previously, the cost functions selected may vary, depending on the specific application for the string comparison.

In the simplest embodiment, the deletion cost evaluation block 906, insertion cost evaluation block 910 provide a constant cost independent of the symbol deleted or inserted. These two blocks 906 and 910 may then be replaced by a means for providing a constant value of 1. A simple design for the substitution cost evaluation block 908 consists of a comparator which determines whether or not the pattern symbol and the text symbol have the same value.

One of ordinary skill in the art of digital design could readily construct more elaborate circuits for performing the deletion, substitution and insertion cost evaluations. For matching handwriting, the costs should vary inversely with the relative likelihood's of the substitutions occurring; if two strokes are likely to be confused, then the cost of substituting one for the other should be low. For example, substitution of the arc "z.2" for the stroke "/" should be associated with a smaller edit distance component than substitution of a vertical stroke "|" for a horizontal one, "—". The substitution cost evaluation block 908 could readily be designed to assign: (1) a cost of zero if the pattern symbol and text string symbol match; (2) a small cost, such as 0.5, for a limited number of substitutions between very similar symbols; and (3) a greater edit cost, such as 1.0 for all other substitutions.

An adder 914 adds the cost of deleting symbol $p_i$ to the incoming partial pattern edit distance $d_{i-1,j}$ (PtnDistIn), to form a first edit distance component, $d_{i-1,j}+C_{del}(p_i)$. A second adder 916 adds the cost of substituting pattern symbol $P_i$ for text string symbol $t_j$ and a stored edit distance component $d_{i-1,j-1}$ to for a second edit distance component, $d_{i-1,j-1}+c_{sub(p_i,t_j)}$. A third adder 918 adds the cost of inserting text symbol $t_j$ to the incoming partial text string edit distance $d_{i,j-1}$, to form a third edit distance component, $d_{i,j-1}+c_{ins}(t_j)$. The first, second and third edit distance components are transmitted to block 920, which determines the minimum of the three edit distance components. The minimum edit distance component $d_{i,j}$ is stored in distance register 912.

Distance register 912 is a shift register which stores the values of $d_{i,j}$ and $d_{i-1,j-1}$, and includes a respective output terminal for providing each value $d_{i,j}$ and $d_{i-1,j-1}$. Distance register 912 receives the value of $d_{i,j}$ and stores the value until the next cycle. Distance register 912 provides the minimum edit distance component $d_{i,j}$ to the previous processor 40$c$ (shown in FIG. 1) and the next processor 40$e$ (shown in FIG. 1). Distance register 912 also provides the previous minimum edit distance component $d_{i-1,j-1}$ to the adder 916 which computes the second edit distance component.

Even with a maximum cost of 1, the edit distance between two strings may be as large as m+n. In general, the number of bits grows with the lengths of the two strings being compared, and is also determined by the particular edit cost assignments used. Thus, at first impression, it might appear that each processor requires an adder and a comparator for numbers O(log(m+n)) bits long. However, manipulating such large values is unnecessary for the case in which the following edit costs are assigned: $c_{del}=c_{sub}=1$; and $c_{sub}=2$. The inventor has determined that, given these specific edit costs, a constant two bits will suffice. At any instant in time, adjacent processors' edit distances are close in magnitude; hence it is only necessary to compute low order bits. These edit costs are used in the exemplary embodiment.

As the truncated values shift out of the right side of the array, the full edit distance is reconstructed using a small amount of external logic as the strings 24 shift out. As a result, it becomes possible to fit tens or even hundreds of processing elements on a single VLSI chip.

FIG. 10 is a block diagram of exemplary external logic for reconstructing the final edit distance. An up/down counter 1004 is pre-loaded with the length of the target string and a simple finite state machine 1002 increments or decrements counter 1004 appropriately, as is shown in FIG. 10. The steps executed by the finite state machine 1002 are as follows:

Inputs: Statein, Counterlow
Outputs: Count
If (Statein=(Counterlow−1) mod 4)
then Count←decremented
else Count←incremented
This assumes that Statein is a 2-bit value.

ALTERNATE ARCHITECTURE FOR WORD SPOTTING

Because the word-spotting variation of the edit distance computation shown in FIG. 5 uses the same equations (3) to (6) and has the same data-flow as the string comparison computation shown in FIG. 3, the systolic array described with reference to FIGS. 7B, 8A–8C and 9 could be used for word-spotting. However, this array requires O(m+n) processors. If the text string 34 is long, then n is large, and building an array to complete the entire computation in one pass may not be practical. While there are techniques for partitioning the data-dependence graph so that it may be executed on a smaller array, another approach is to choose a different space-time mapping.

FIGS. 11A and 11B show an alternative embodiment which may be more suitable for word-spotting.

Whereas the array 30 shown in FIG. 7B has a bi-directional data-flow, the array 1130 in FIG. 11B is unidirectional; all values flow from left to right. The computation comprises two distinct phases. First, the pattern string 24 (of FIG. 1) is shifted into the array 1130 from the left side (beginning with processing element 1140a) and latched in place. Then the text string 34 is streamed by. The text string 34 of (FIG. 1) also enters from the left side, beginning with processing element 1140a. The pattern string is entered in the correct order, and the text string 34 is entered in reverse order. Thus the text string "compress" would be entered as "sserpmoc". Not only are the letters in each word reversed; the symbols within each letter are reversed as well. This ensures that the symbols are compared in the same order as in the embodiment of FIGS. 7A and 8A–8C.

As the text symbols flow through, the distance values are updated in much the same way as with the array 30 shown in FIGS. 7B and 8A–8C. In the case where a value is produced at step k for use by a neighboring processor at step k+2, an additional buffer is used (as shown in FIG. 12) to maintain the value during step k+1. This small amount of extra hardware partially offsets the savings from not having 50% of the processors idle during any particular step, as with the embodiment of FIGS. 7B and 8A–8C.

The length of this array is determined solely by the pattern sequence, so the number of processors required is p=m. The computation proceeds in the temporal direction for as long as necessary to process the entire text string.

FIG. 12 is a block diagram of an exemplary processing element 1140b suitable for use in the array 1130 shown in FIG. 11B. As noted above with reference to FIG. 11A, the processing element 1140b of array 1130 executes the functions specified in equations (3) through (6), above. Thus, the following components of processing element 1140b may be the same as the corresponding elements of processing element 40d shown in FIG. 9, and are not described in detail herein: registers 1202 and 1204, the deletion cost evaluation 1206, substitution cost evaluation 1208, insertion cost evaluation 1210, adders 1214, 1216 and 1218, and minimum value function 1220.

Processing element 1140b includes a single data input terminal $T_i$ for receiving both the pattern string 24 and the text string 34 from the previous processing element 1140a, and a single output terminal $T_o$ for transmitting the pattern 24 and text 34 to the next processing element 1140c. A demultiplexer 1201 receives the input symbol stream and transmits it to either the pattern register 1202 or the text string register 1204. A multiplexer 1203 receives either the pattern symbol from 110 the pattern register 1202 or the text symbol from the text register 1204 and transmits the received symbol to the output terminal $T_o$. Both the demultiplexer 1201 and the multiplexer 1203 are switched by a common, externally provided multiplexer control signal MC. The signal MC synchronizes the transmission of symbols in the other processing elements 1140a and 1140c–1140o as well.

The signal MC causes the processing element to operate in one of the following two modes: a pattern string entry mode and a text string entry mode. In the pattern string entry mode, the pattern string 24 is transmitted to the processing elements 1140a–1140o and latched in register 1202. In the text string entry mode, the text strings 34 are streamed by and compared to the pattern string.

The mapping of the computations to processing elements as shown in FIGS. 11A and 11B results in a different mapping of the computations to time slots, as shown in FIG. 11A. This requires additional storage for the partial edit distance components, which is provided by shift registers 1211 and 1212. (This may be contrasted to the processing element 40d of FIG. 9, which only requires a single shift register 912).

The first shift register 1211 receives the partial edit distance component $d_{i-1,j}$ from the $i-1_{th}$ processing element 1140a via the PtnDistIn terminal. The value of $d_{i-1,j}$ is used in the current processing cycle k by adder 1214 to compute the first edit distance component, $d_{i-1,j}+c_{del}(p_i)$ The value of $d_{i-1,j}$ is also stored in shift register element 1211a. The value $(d_{i-1,j-1})$ stored in shift register element 1211a at time k−1 is shifted to shift register element 1211b at time k, and is transmitted to adder 1216 for computing the second edit distance component $d_{i-1,j-1}+c_{sub}(p_i,t_j)$ The second shift register 1212 receives the edit distance component $d_{i,j}$ from the minimum function 1220 at time k. The value of $d_{i,j}$ is stored in shift register element 1212a and is transmitted to the $i+1^{th}$ processing element 1140c via the PtnDistOut terminal. The value $d_{i,j-1}$ previously stored in shift register element 1212a at time k−1 is shifted to element 1212b. The value $d_{i,j-1}$ is transmitted to adder 1218 for computing the third edit distance component, $d_{i,j}+C_{ins}(t_j)$

APPARATUS FOR HANDLING SEGMENTATION

Equation (7) above is similar to Equation (6), but equation (7) has a second level of dependencies (for the multi-symbol substitutions). That is, the edit distance component $d_{i,j}$ is not only dependent on the component $d_{i,j}$ received from the nearest previous processing element (the $i-1^{th}$ element), but is also dependent on components $d_{i-2,j-1}$ and $d_{i-2,j-2}$ previously received from the $i-2^{th}$ element.

FIG. 13A is a data flow diagram showing the relationships among the edit distance components computed during execution of equation (7). One of ordinary skill in the art will readily recognize that array 1300 shows the recurrence relation (also called recursion relation) of equation (7). In FIG. 13A, the computation of the edit distance for any node past the second row and past the second column (i.e., all $d_{i,j}$ such that i>2 and j>2) is dependent on five previous values: $d_{i-1,j}$; $d_{i-2,j-1}$; $d_{i-1,j-1}$; $d_{i-1,j-2}$; and $d_{i,j-1}$. Equation (7) also uses $d_{i-2,j-2}$, which is not shown by a separate arrow in FIG. 13A.

FIGS. 13B and 13C show the space-time mapping of the edit distance component computations shown in FIG. 13A onto a linear systolic array shown in FIG. 13C. Array 1330 differs from the array 1130 shown in FIG. 11B, in that the edit distance component $d_{i,j}$ computed in the $i^{th}$ processing element is provided to both the i+1$^{th}$ element and the i+2$^{th}$ element. As described with reference to FIG. 14 below, the processing elements 1340a–1340d require additional buffer storage between adjacent processors to store the distance values required to compute the i+2$^{th}$ edit distance component, $d_{i+2,j}$.

FIG. 14 is a block diagram of the exemplary processing element 1340c shown in FIG. 13C. The processing element 1340c receives the pattern string symbols, which are stored in the pattern register 1402. Pattern register 1402 is a shift register which stores the i$^{th}$ symbol $p_i$ and the i–1$^{th}$ symbol, $p_{i-1}$. It is necessary to store two pattern symbols for the segmentation evaluations. Similarly, the text string symbols are stored in the text string symbol register 1404, which is also a shift register. Register 1404 stores the j$^{th}$ text symbol, $t_j$, and the j–1$^{th}$ text symbol, $t_{j-1}$.

The element 1340c has a substitute-1-for-1 (hereafter, sub1:1) evaluation function that is identical to the substitution evaluation function 1208 shown in FIG. 12. In addition to the sub1:1 evaluation function 1208, the element 1340c of FIG. 14 has three other substitution evaluation functions 1408b–1408d. The substitute-1-for-2 (hereafter, sub1:2) evaluation function 1408b determines the segmentation edit cost of substituting one pattern symbol for two text symbols.

The substitute-2-for-1 (hereafter, sub2:1) evaluation function 1408c determines the segmentation edit cost of substituting two pattern symbols for one text symbol. The substitute-2-for-2 (hereafter, sub2:2) evaluation function 1408d determines the segmentation edit cost of substituting two pattern symbols for two different text symbols.

The edit distance value $d_{i-1,j}$ received from the i–1$^{th}$ element 1340b is stored in a shift register 1411. Shift register 1411 has three storage elements 1411a–1411c, for storing $d_{i-1,j}$, $d_{i-1,j-1}$ and $d_{i-1,j-2}$, respectively. The value $d_{i-1,j-1}$ (used for the sub1:1 evaluation computation) was received from the i–1$^{th}$ processing element one cycle earlier. The value of $d_{i-1,j-2}$ stored in storage element 1411c (used by the sub1:2 evaluation function 1408b) was received from the i–1$^{th}$ processing element two cycles earlier.

In addition, an edit distance value $d_{i-2,j}$ is received by an additional shift register 1413, from the i–2$^{th}$ processing element 1340a at time k. The value $d_{i-2,j}$ is stored in the first storage element 1413a. The previous value $d_{i-2,j}$31 1 (stored in the second storage element 1413b) was received from the i–2$^{th}$ processing element 1340a at time k–1. $d_{i-2,j-1}$ is used by the sub2:1 evaluation function 1408c. The j–2$^{th}$ value $d_{i-2,j-2}$ (stored in the third storage element 1413c) was received from the i–2$^{th}$ processing element 1340a at time k–2. $d_{i-2,j-2}$ is used by the sub2:2 evaluation function 1408d.

As with the substitution evaluation functions 908 in FIG. 9 and 1208 in FIG. 12, the simplest embodiment of the sub1:1, sub1:2, sub2:1 and sub2:2 evaluation functions 1408a–1408d provide a constant output value of 1 regardless of which symbol(s) is substituted for which other symbol(s). As noted above with reference to the substitution evaluation function 908 of FIG. 9, more complex substitution evaluation functions 1408a–1408d may be used to impose a lower edit cost for segmentation errors (e.g., ∩←

), ( )←∩, or "]"←"["") that are known to have a higher probability of occurrence.

The systolic arrays described herein may be realized using a variety of target technologies, including custom VLSI, semi-custom VLSI (e.g., gate arrays, standard cells), and field programmable gate arrays (FPGA's). Systolic array architectures using these technologies have been implemented in apparatus for matching deoxyribonucleic acid (DNA) sequences. These include the Princeton Nucleic Acid Comparator (P-NAC), a custom nMOS VLSI chip described in a paper by R. Lipton and D. Lopresti, entitled "A Systolic Array for Rapid String Comparison," published in *Proceedings of the 1985 Chapel Hill Conference on Very Large Scale Integration*, Henry Fuchs, editor, pages 363–376, 1985, expressly incorporated by reference herein for its teachings on to systolic array architectures using nMOS. All of these devices used edit cost functions that are inappropriate for electronic ink matching.

The Brown Systolic Array (B-SYS) is a custom CMOS VLSI chip described in a paper by R. Hughey and D. Lopresti entitled, "Architecture of a Programmable Systolic Array," which appears in *Proceedings of the International Conference on Systolic Arrays*, 1988, pages 41–49, edited by Keith Bromley et al, and is expressly incorporated herein by reference for its teachings on systolic array architectures using CMOS.

SPLASH is a programmable FPGA architecture based on a commercial part (the Xilinx 3090), described in a paper by M. Gokhale et al., "Building and using a highly parallel Programmable Logic Array," Computer, 24(1), pages 81–89, 1981, which is expressly incorporated by reference herein for its teachings on systolic array architectures using FGPA's.

Although the exemplary embodiments assumed that matching occurs at the level of segmented pen strokes, one of ordinary skill in the art could readily apply the techniques described herein to match handwriting at other levels. Matching could take place at any level in traditional handwriting processing, from the pen strokes generated by the user on up through the ASCII text (possibly containing errors) returned by a handwriting recognition engine. The general matching techniques described above should work equally well in any domain, but clearly a systolic array implementation depends on the matching model to be supported.

In Hidden Markov Models (HMM's) are another technique that have been applied to a variety of recognition problems, including handwriting recognition. The Viterbi algorithm for evaluating HMM's bears a resemblance to the dynamic programming algorithm for string edit distance. Hence, one of ordinary skill in the art may develop parallel systolic versions of this approach as well.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. Apparatus for comparing an electronic handwritten pattern to a stored string representing a handwritten document comprising at least one of the group consisting of a paragraph, a page, a sentence, text and graphics, the stored string including a group of portions, each portion having at least one stroke, the apparatus comprising:

means for monitoring movement of a stylus that forms the electronic handwritten pattern, the handwritten pattern being shorter than the stored string, the monitoring means generating therefrom an input handwritten sequence of strokes, each stroke representing one of a plurality of predetermined stylus movements within a predetermined alphabet, the input handwritten sequence of strokes having a plurality of portions;

a linear systolic array processor for determining an edit distance between a substring of the stored string and the input handwritten sequence of strokes, thereby to search the stored string of handwritten strokes for an occurrence of the input handwritten sequence of strokes, the substring including a subset of the group of portions, the linear systolic array processor including:

means for comparing a first one of the group of portions of the stored string to a first one of the plurality of portions of the input handwritten sequence of strokes to form a comparison, and for generating a plurality of edit distance components based on the comparison, each edit distance component corresponding to a respectively different set of operations that transforms the first portion of the stored string into the first portion of the pattern, wherein at least one of the plurality of edit distance components is calculated based on a further comparison between a second portion of the stored string and a second portion of the handwritten sequence of strokes, wherein the means for comparing generates the plurality of edit distance components including a group of initial edit components related to the stored string which are set to 0, means for selecting the edit distance component which has a minimum value among the plurality of edit distance components, means for determining the edit distance based on a plurality of comparisons, wherein the plurality of comparisons includes the comparison and the further comparison, and means for determining which substring of the stored string differs from the input handwritten sequence of strokes by the smallest edit distance, thereby locating the one substring within the stored string that most closely matches the input handwritten sequence of strokes that is shorter than the stored string.

2. Apparatus according to claim 1, wherein each stroke in the sequence of strokes is represented by a respective feature vector that defines an orientation, a velocity and an acceleration.

3. Apparatus according to claim 1, wherein the linear systolic array processor comprises a plurality of processing elements connected in a line, such that the strokes in the sequence of strokes are successively transmitted across the line of processing elements in a first direction, while the corresponding strokes within the stored string are successively transmitted across the line of processing elements in a second direction opposite the first direction.

4. Apparatus according to claim 3, wherein each respective processing element comprises:

means for receiving a stroke within the sequence of strokes from a previous one of the plurality of processing elements;

means for receiving a stroke within the stored string from a next one of the plurality of processing elements; and means for comparing the stroke within the sequence to the stroke within the stored string to produce a comparison and for adjusting the respective edit distance for the stored string based on the comparison.

5. Apparatus according to claim 4, wherein the respective comparing means in each processing element comprises:

means for determining a first edit distance component based on a given stroke being present at the specific position within the sequence of strokes but absent from the specific position within the stored string;

means for determining a second edit distance component based on the given stroke being present at the specific position within the stored string, but a different stroke being substituted therefor at the specific position within the sequence of strokes;

means for determining a third edit distance component based on the given stroke being present at a specific position within the stored string but being absent from the specific position within the sequence of strokes;

means for selecting a minimum component from the group consisting of the first, second and third edit distance components.

6. Apparatus according to claim 5, wherein each comparing means further comprises:

means for transmitting the minimum component to a previous one of the plurality of processing elements and to a next one of the plurality of processing elements.

7. Apparatus according to claim 4, wherein each respective processing element includes:

means for transmitting a stroke within the sequence of strokes to the next one of the plurality of processing elements after the comparing means executes the comparison; and means for transmitting a stroke within the stored string to the previous one of the plurality of processing elements after the comparing means executes the comparison.

8. Apparatus according to claim 1, wherein the linear systolic array processor comprises a plurality of processing elements connected in a line, such that each one of the plurality of processing elements includes means for storing a respective one of the strokes in the sequence of strokes, and the corresponding strokes within the stored string are successively transmitted across the line of processing elements.

9. Apparatus according to claim 8, wherein the strokes within the stored string are transmitted across the line of processing elements in a further sequence opposite the sequence of strokes of the handwritten pattern.

10. Apparatus according to claim 8, wherein each respective one of the processing elements comprises:

means for receiving a stroke within the stored string from a previous one of the plurality of processing elements; and means for comparing the respective stroke from the sequence stored within the one processing element to the stroke from the stored string, and for adjusting the respective edit distance for the one stored string based on the comparison.

11. Apparatus according to claim 10, wherein each respective processing element includes:

means for transmitting a stroke within the sequence of strokes to a next one of the plurality of processing elements after the comparing means executes the comparison.

12. Apparatus according to claim 10, wherein the respective comparing means in each processing element comprises:

deletion evaluation means for determining a first edit distance component based on a first stroke being present at the specific position within the sequence of strokes but being absent from the specific position within the stored string;

1-for-1-substitution evaluation means for determining a second edit distance component based on the first stroke being present at the specific position within the stored string, but a second stroke being substituted therefor at the specific position within the sequence of strokes;

insertion evaluation means for determining a third edit distance component based on the first stroke being present at a specific position within the stored string but being absent from the specific position within the sequence of strokes;

means for selecting a minimum component from the group which includes the first, second and third edit distance components; and means for adding the minimum component to a previously generated edit distance component for the stored string during the further comparison.

13. Apparatus according to claim 12, wherein each processing element further comprises:

means for transmitting the minimum component to a next one of the plurality of processing elements.

14. Apparatus according to claim 13, wherein the minimum component transmitted by each processing element to the next one of the plurality of processing elements is used as an input edit distance component by the next processing element, and each processing element further comprises:

means for receiving the input edit distance component from the previous processing element;

means for storing the input edit distance component for a period of time during which the processing element processes the first stroke, and for transmitting the input edit distance component to the 1-for-1-substitution evaluation means after the period of time, wherein the 1-for-1-substitution evaluation means uses the input edit distance component to compute the second edit distance component.

15. Apparatus according to claim 14, wherein:

the comparing means further comprises 1-for-2-substitution evaluation means for determining a 1-for-2-substitution edit distance component based on two strokes being present at the specific position within the stored string, but a single stroke being substituted therefor at the specific position within the sequence of strokes;

the group from which the minimum component is selected further includes the 1-for-2-substitution edit distance component;

the storing means includes:

(a) means for storing the input edit distance component for a further period of time during which the processing element processes a further stroke which follows the first stroke, and (b) means for transmitting the input edit distance component to the 1-for-2-substitution evaluation means after the further period of time;

wherein the 1-for-2-substitution evaluation means uses the input edit distance component to compute the 1-for-2-substitution edit distance component.

16. Apparatus according to claim 12, wherein the plurality of processing elements are ordinally numbered first through $N^{th}$, where N is an integer, and each processing element further comprises:

means for transmitting the minimum component to an $i+2^{th}$ one of the plurality of processing elements positioned after the next one of the plurality of processing elements, where i is an integer greater than two and less than N−1; and means for receiving an input edit distance component from an $i-2^{th}$ one of the plurality of processing elements positioned before the previous one of the plurality of processing elements.

17. Apparatus according to claim 16, wherein:

the comparing means further comprises 2-for-1-substitution evaluation means for determining a 2-for-1 substitution edit distance component based on a single stroke being present at the specific position within the stored string, but two strokes being substituted therefor at the specific position within the sequence of strokes;

the group from which the minimum component is selected further includes the 2-for-1 substitution edit distance component; and the apparatus further comprises:

(a) means for storing the input edit distance component received from the $i-2^{th}$ processing element for a period of time during which the $i^{th}$ processing element processes one stroke of the stored string;

(b) means for transmitting the input edit distance component received from the $i-2^{th}$ processing element to the 2-for-1-substitution evaluation means after the period of time;

wherein the 2-for-1-substitution evaluation means uses the input edit distance component received from the $i-2^{th}$ processing element to compute the 2-for-1 substitution edit distance component.

18. Apparatus according to claim 17, wherein:

the comparing means further comprises 2-for-2-substitution evaluation means for determining a 2-for-2-substitution edit distance component based on two strokes being present at the specific position within the stored string, but two further strokes being substituted therefor at the specific position within the sequence of strokes;

the group from which the minimum component is selected further includes the 2-for-2-substitution edit distance component; and the apparatus further comprises:

(a) means for storing the input edit distance component received from the $i-2^{th}$ processing element for a further period of time during which the processing element processes a further stroke which follows the one stroke; and (b) means for transmitting the input edit distance component received from the $i-2^{th}$ processing element to the 2-for-2-substitution evaluation means after the further period of time;

wherein the 2-for-2-substitution evaluation means uses the input edit distance component received from the $i-2^{th}$ processing element to compute the 2-for-2-substitution edit distance component.

19. Apparatus according to claim 12, wherein each of the plurality of processing elements includes means for adjusting the edit distance when the sequence of strokes is identified as being different from the stored string because a subset of the sequence of strokes representing a single symbol in the stored string is identified as being two symbols other than the single symbol.

20. Apparatus according to claim 12, wherein each of the plurality of processing elements includes means for adjusting the edit distance when the sequence of strokes is identified as being different from the stored string because a subset of the sequence of strokes representing two symbols in the stored string is identified as being a single symbol other than either of the two symbols.

21. Apparatus according to claim 12, wherein each of the plurality of processing elements includes means for adjusting the edit distance when the sequence of strokes is identified as being different from the stored string because a subset of the sequence of strokes representing two given symbols in the stored string is identified as representing two predetermined symbols other than the two given symbols.

22. Apparatus for comparing an electronic handwritten pattern to a stored string representing a handwritten document comprising at least one of the group consisting of a paragraph, a page, a sentence, text and graphics, the stored string including a group of strokes, comprising:

means for monitoring movement of a stylus that forms the electronic handwritten pattern, the handwritten pattern being shorter than the stored string, the monitoring means generating therefrom an input handwritten sequence of strokes, each stroke representing one of a plurality of predetermined stylus movements within a predetermined alphabet;

a linear systolic array processor for determining an edit distance between a substring of the stored string and the sequence of strokes, the substring including a subset of the group of strokes, the linear systolic array processor comprising a plurality of processing elements connected in a line, such that each one of the plurality of processing elements includes means for storing a respective one of the strokes in the input handwritten sequence of strokes, and the group of strokes within the stored string are successively transmitted across the line of processing elements, in order to search the stored string of handwritten strokes for an occurrence of the input handwritten sequence of strokes, each of the plurality of processing elements including:

means for receiving first and second input edit distance components from first and second previous ones of the plurality of processing elements, and for storing the first and second input edit distance components for a period of time during which the processing element processes two of the strokes within the input handwritten sequence of strokes, means for comparing a portion of the stored string to a portion of the pattern to form a comparison, and for generating a plurality of edit sequence components based on (1) the comparison and (2) the first and second input edit distance components, each edit sequence component identifying a respectively different set of operations that transforms the portion of the stored string into the portion of the pattern, each edit sequence component having a respective edit distance components, wherein the means for comparing generates the plurality of edit distance components including a group of initial edit components related to the stored string which are set to 0, means for selecting the edit sequence component for which the edit distance component has a minimum value; and means for determining which substring of the stored string differs from the input handwritten sequence of strokes by the smallest edit distance, thereby locating the one substring within the stored string that most closely matches the input handwritten sequence of strokes that is shorter than the stored string.

23. Apparatus for comparing an electronic handwritten pattern to a stored string representing a handwritten document comprising at least one of the group consisting of a paragraph, a page, a sentence, text and graphics, the stored string including a group of strokes, comprising:

means for monitoring movement of a stylus that forms the electronic handwritten pattern, and for generating therefrom an input handwritten sequence of strokes, each stroke representing one of a plurality of predetermined stylus movements within a predetermined alphabet;

a linear systolic array processor for determining an edit distance between the stored string and the input handwritten sequence of strokes, thereby to search the stored string of handwritten strokes for an occurrence of the input handwritten sequence of strokes, the linear systolic array processor comprising a plurality of processing elements connected in a line, such that each one of the plurality of processing elements includes means for storing a respective one of the strokes in the input handwritten sequence of strokes, and the corresponding strokes within the stored string are successively transmitted across the line of processing elements, each of the plurality of processing elements including:

(a) means for determining a first edit distance component based on a given stroke being present at the specific position within the input handwritten sequence of strokes but being absent from the specific position within the stored string;

(b) means for determining a second edit distance component based on the given stroke being present at the specific position within the stored string, but a different stroke being substituted therefor at the specific position within the input handwritten sequence of strokes;

(c) means for determining a third edit distance component based on two strokes being present at the specific position within the stored string, but a single stroke being substituted therefor at the specific position within the input handwritten sequence of strokes;

(d) means for determining a fourth edit distance component based on a single stroke being present at the specific position within the stored string, but two strokes being substituted therefor at the specific position within the input handwritten sequence of strokes;

(e) means for determining a fifth edit distance component based on two strokes being present at the specific position within the stored string, but two further strokes being substituted therefor at the specific position within the input handwritten sequence of strokes;

(f) means for determining a sixth edit distance component based on the given stroke being present at a specific position within the stored string but being absent from the specific position within the input handwritten sequence of strokes;

(g) means for selecting a minimum component from the group consisting of the first through sixth edit distance components, wherein the systolic array processor generates the first through sixth edit distance components to include a group of initial edit components related to the stored string which are set to 0.

24. A method for comparing an electronic handwritten pattern to a stored string representing a handwritten document comprising at least one of the group consisting of a paragraph, a page, a sentence, text and graphics, the stored string including a group of strokes, comprising the steps of:

(1) monitoring movement of a stylus that forms the electronic handwritten pattern, the handwritten pattern being shorter than the stored string, and generating therefrom an input handwritten sequence of strokes, each stroke representing one of a plurality of predetermined stylus movements within a predetermined alphabet;

(2) transmitting the group of strokes and the input handwritten sequence of strokes to a linear systolic array processor comprising a plurality of cascade connected processing elements, (3) storing a respective one of the strokes in the input handwritten sequence of strokes within each one of the plurality of processing elements (4) transmitting the group of strokes within the stored string successively across the cascade connected processing elements, each of the plurality of processing elements performing the steps of:

(a) receiving first and second input edit distance components from first and second previous ones of the plurality of processing elements, (b) storing the first and second input edit distance components for a period of time during which the processing element processes two of the strokes within the input handwritten sequence of strokes, (c) comparing a portion of the stored string to a portion of the pattern to form a comparison, (d) generating a plurality of edit sequence components based on (1) the comparison and (2) the first and second input edit distance components, each edit sequence component identifying a respectively different set of operations that transforms the portion of the stored string into the portion of the pattern, each edit sequence component having a respective edit distance component, and (e) selecting the edit sequence component for which the edit distance component has a minimum value;

(5) determining an edit distance between a subset of the stored string and the input handwritten sequence of strokes, the substring including a subset of the group of strokes, based on the edit sequence component selected by a last one of the plurality of processing elements; including a step of generating the edit distance to include an initial edit component related to the stored string which is set to 0, and (6) determining which substring of the stored string differs from the input handwritten sequence of strokes by the smallest edit distance, thereby locating the one substring within the stored string that most closely matches the input handwritten sequence of strokes that is shorter than the stored string, thereby to search the stored string of handwritten strokes for an occurrence of the sequence of strokes.

25. Apparatus according to claim 1, wherein the stored string represents a database of handwritten information, and the systolic array processor determines a subset of the database which most closely matches the sequence of strokes.

* * * * *